United States Patent
Taylor et al.

(10) Patent No.: US 11,794,888 B1
(45) Date of Patent: Oct. 24, 2023

(54) UNMANNED AERIAL VEHICLE

(71) Applicant: Taylor & Lego Holdings, LLC., Sarasota, FL (US)

(72) Inventors: Alan Taylor, Myakka City, FL (US); Matthew J. Dressig, Sarasota, FL (US); Beau Reid, Los Angeles, CA (US)

(73) Assignee: TAYLOR & LEGO HOLDINGS, LLC., Sarasota, FL (US)

( * ) Notice: Subject to any disclaimer, the term of this patent is extended or adjusted under 35 U.S.C. 154(b) by 668 days.

(21) Appl. No.: 16/415,724

(22) Filed: May 17, 2019

Related U.S. Application Data

(60) Provisional application No. 62/673,592, filed on May 18, 2018.

(51) Int. Cl.
| | |
|---|---|
| *B64C 27/52* | (2006.01) |
| *B64C 39/02* | (2023.01) |
| *B64U 10/13* | (2023.01) |
| *B64U 50/19* | (2023.01) |

(52) U.S. Cl.
CPC ............ *B64C 27/52* (2013.01); *B64C 39/024* (2013.01); *B64U 10/13* (2023.01); *B64U 50/19* (2023.01)

(58) Field of Classification Search
CPC ....... B64C 27/52; B64C 39/024; B64C 27/08; B64C 25/52; B64C 2201/027; B64C 2201/042; B64C 2201/108; E05D 15/505; E05C 3/24; F16B 5/0092; F16B 2/185; B64U 10/13; B64U 50/19
See application file for complete search history.

(56) References Cited

U.S. PATENT DOCUMENTS

| | | | | |
|---|---|---|---|---|
| 9,974 | A * | 8/1853 | Mitchel | B41B 15/08 276/17 |
| 6,922,610 | B2 * | 7/2005 | Okamoto | B25J 9/06 318/568.22 |
| 7,810,862 | B2 * | 10/2010 | Smith | B60R 7/04 220/817 |
| 8,695,919 | B2 * | 4/2014 | Shachor | B64C 29/04 244/17.11 |
| 9,260,184 | B2 * | 2/2016 | Olm | B64C 27/08 |
| D770,940 | S * | 11/2016 | Taylor | D12/16.1 |
| D803,328 | S * | 11/2017 | Lee | D21/441 |
| D807,785 | S * | 1/2018 | Taylor | D12/16.1 |
| 9,914,537 | B2 * | 3/2018 | Wu | B64D 47/08 |
| 9,926,955 | B1 * | 3/2018 | Taylor | H01Q 15/165 |
| 9,974,209 | B1 | 5/2018 | Taylor | |

(Continued)

*Primary Examiner* — Medhat Badawi
(74) *Attorney, Agent, or Firm* — Frijouf, Rust & Pyle, P.A.

(57) ABSTRACT

An unmanned aerial vehicle includes a fuselage defining a fuselage chamber. A first boom is coupled to the fuselage. A first rotor lift assembly is coupled to the first boom for providing a first lifting force. A second boom is coupled to the fuselage. A second rotor lift assembly is coupled to the second boom for providing a second lifting force. A third boom is coupled to the fuselage. A third rotor lift assembly is coupled to the third boom for providing a third lifting force. A fourth boom is coupled to the fuselage. A fourth rotor lift assembly is coupled to the fourth boom for providing a fourth lifting force. An electronic controller system is within the fuselage and operates the first rotor lift assembly, the second rotor lift assembly, the third rotor lift assembly and the fourth rotor lift assembly.

17 Claims, 16 Drawing Sheets

(56) References Cited

U.S. PATENT DOCUMENTS

| | | | | |
|---|---|---|---|---|
| 10,035,589 B2* | 7/2018 | Zhang | | B64C 27/08 |
| D864,022 S * | 10/2019 | Gan | | D12/328 |
| D866,396 S * | 11/2019 | Chen | | D12/16.1 |
| D873,175 S * | 1/2020 | Li | | D12/328 |
| 10,543,918 B1* | 1/2020 | Kimchi | | B64C 39/024 |
| D881,067 S * | 4/2020 | Zhou | | D12/16.1 |
| D882,460 S * | 4/2020 | Chen | | D12/16.1 |
| 10,633,085 B2* | 4/2020 | von Flotow | | B64D 35/02 |
| 10,647,404 B2* | 5/2020 | Sugaki | | B64C 27/50 |
| 10,696,414 B2* | 6/2020 | Woodman | | B64C 25/10 |
| 10,787,249 B2* | 9/2020 | Oberndorfer | | B64C 25/62 |
| 10,870,486 B2* | 12/2020 | Bailey | | B64C 39/08 |
| 10,882,615 B2* | 1/2021 | Bhat | | B64C 39/024 |
| 10,946,959 B2* | 3/2021 | Nwosu | | B64D 27/24 |
| 11,027,833 B2* | 6/2021 | Zhang | | B64C 27/14 |
| 11,027,844 B2* | 6/2021 | von Flotow | | B64D 5/00 |
| 11,034,448 B2* | 6/2021 | Peng | | F16C 11/04 |
| D934,151 S * | 10/2021 | Liang | | D12/328 |
| 11,220,334 B2* | 1/2022 | Kim | | B64D 27/24 |
| 2010/0025101 A1* | 2/2010 | Stettler | | H05K 5/0213 |
| | | | | 174/521 |
| 2010/0087130 A1* | 4/2010 | Nitsche | | B60H 1/00564 |
| | | | | 454/76 |
| 2010/0096505 A1* | 4/2010 | De Freitas | | B64C 1/143 |
| | | | | 49/400 |
| 2010/0108801 A1* | 5/2010 | Olm | | B64C 39/024 |
| | | | | 244/17.23 |
| 2012/0083945 A1* | 4/2012 | Oakley | | G05D 1/0858 |
| | | | | 701/2 |
| 2013/0146716 A1* | 6/2013 | Gettinger | | B64C 39/024 |
| | | | | 244/49 |
| 2014/0032034 A1* | 1/2014 | Raptopoulos | | H04B 7/18506 |
| | | | | 701/25 |
| 2014/0097293 A1* | 4/2014 | Roberts | | B64C 25/60 |
| | | | | 267/153 |
| 2014/0291372 A1* | 10/2014 | Smith | | B60R 7/04 |
| | | | | 224/539 |
| 2015/0259066 A1* | 9/2015 | Johannesson | | B64C 27/08 |
| | | | | 244/17.27 |
| 2015/0321755 A1* | 11/2015 | Martin | | B64C 27/50 |
| | | | | 244/17.23 |
| 2015/0321758 A1* | 11/2015 | Sama, II | | B64C 39/024 |
| | | | | 244/63 |
| 2016/0025121 A1* | 1/2016 | Ahnert | | F16B 2/185 |
| | | | | 403/373 |
| 2016/0122016 A1* | 5/2016 | Mintchev | | B64C 39/024 |
| | | | | 244/17.23 |
| 2016/0152316 A1* | 6/2016 | Wang | | B64D 47/00 |
| | | | | 244/120 |
| 2016/0167776 A1* | 6/2016 | Shaw | | B64C 27/52 |
| | | | | 244/6 |
| 2016/0194069 A1* | 7/2016 | Taylor | | B64C 27/08 |
| | | | | 244/17.23 |
| 2016/0325834 A1* | 11/2016 | Foster | | B64D 27/24 |
| 2016/0339789 A1* | 11/2016 | Wang | | B60L 53/80 |
| 2016/0376004 A1* | 12/2016 | Claridge | | B64C 39/024 |
| | | | | 701/3 |
| 2017/0085840 A1* | 3/2017 | Mizushina | | B64D 47/08 |
| 2017/0158328 A1* | 6/2017 | Foley | | B64C 27/08 |
| 2017/0183074 A1* | 6/2017 | Hutson | | B64C 25/52 |
| 2017/0203843 A1* | 7/2017 | Chan | | B64D 1/08 |
| 2017/0267334 A1* | 9/2017 | Tsai | | G06T 7/55 |
| 2018/0002023 A1* | 1/2018 | Tian | | F01P 1/06 |
| 2018/0016027 A1* | 1/2018 | Cheatham, III | | G06Q 30/0284 |
| 2018/0118322 A1* | 5/2018 | Harris | | B64C 1/063 |
| 2019/0033889 A1* | 1/2019 | von Flotow | | G05D 1/0661 |
| 2019/0084673 A1* | 3/2019 | Chen | | B64C 3/56 |
| 2019/0291864 A1* | 9/2019 | Liu | | H04N 7/185 |

* cited by examiner

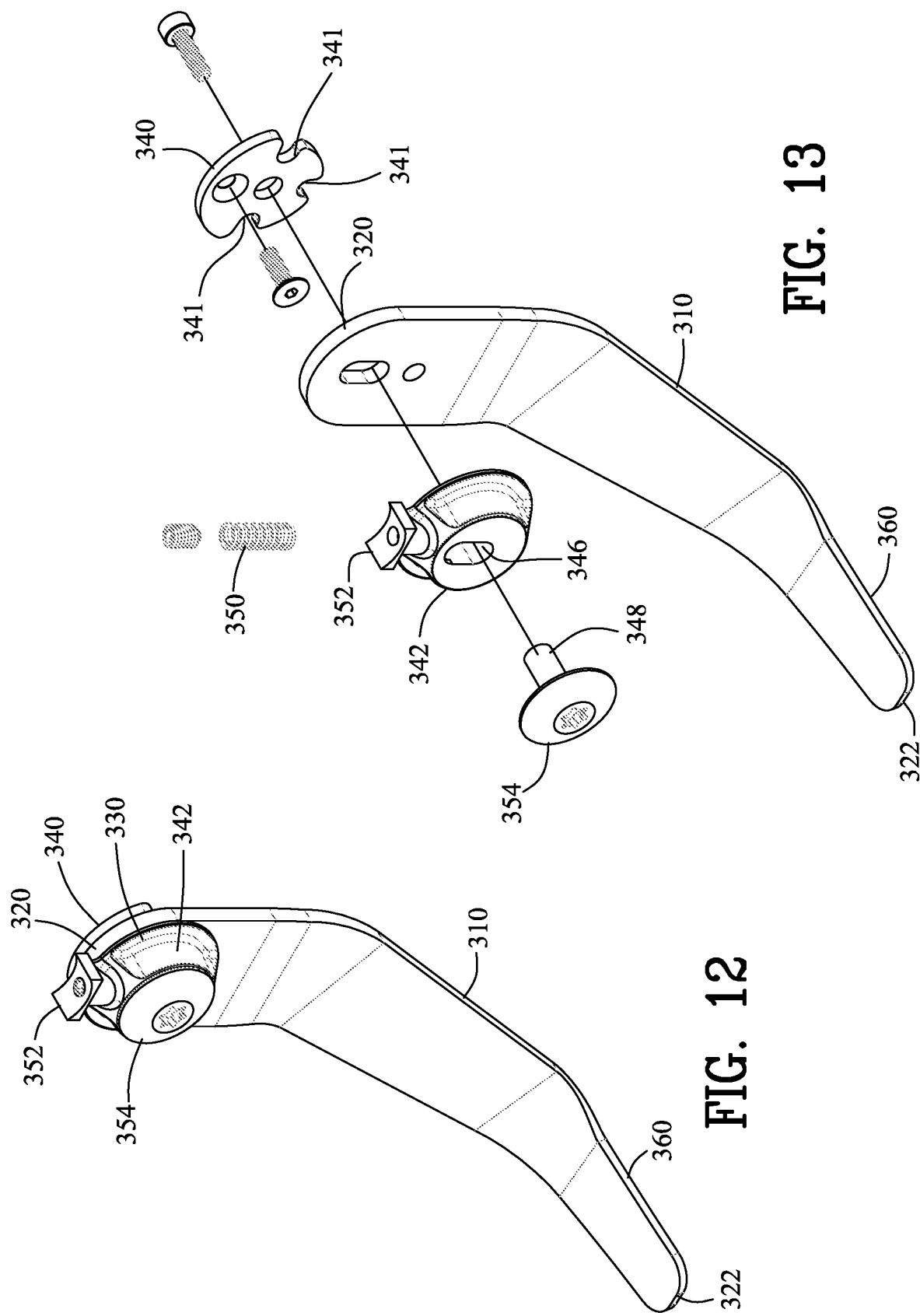

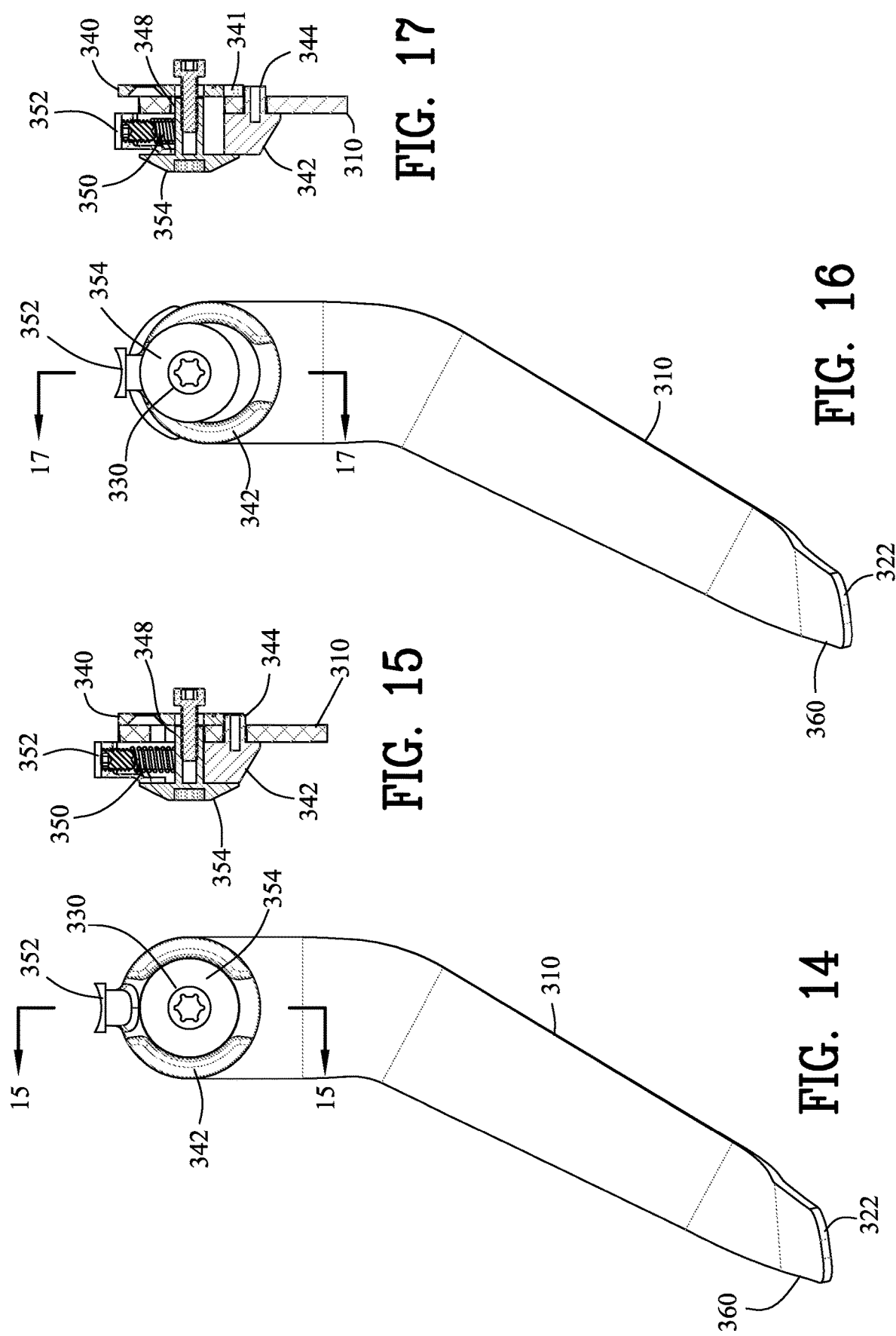

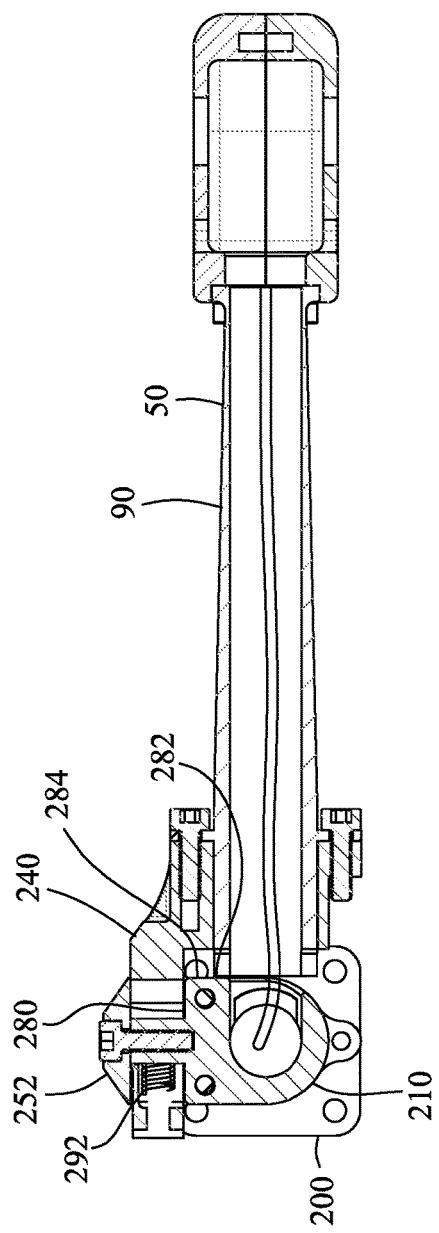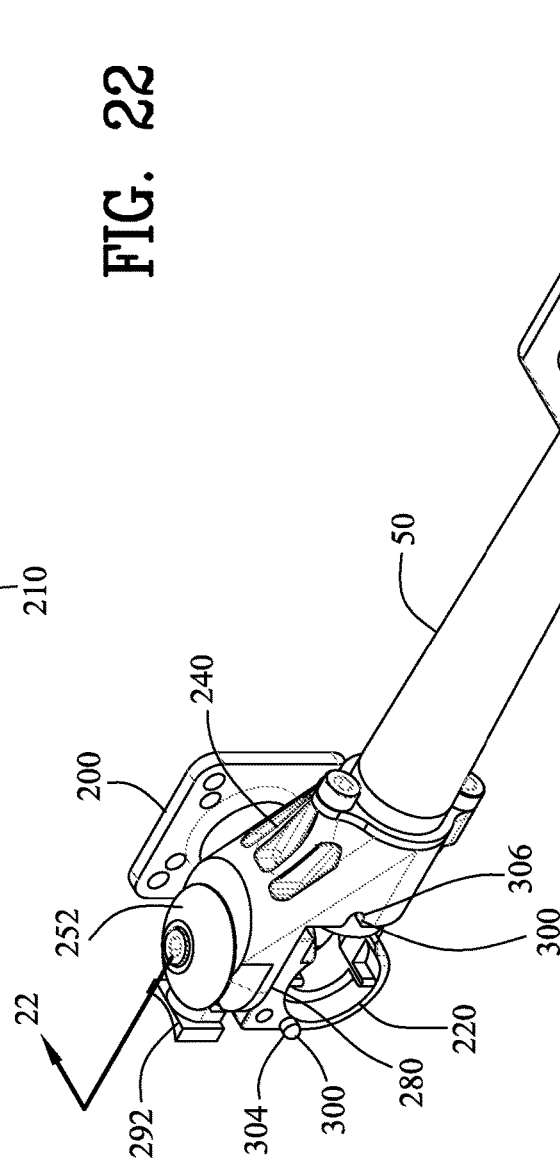
FIG. 22
FIG. 21

UNMANNED AERIAL VEHICLE

CROSS-REFERENCE TO RELATED APPLICATIONS

This application claims benefit of U.S. Patent Provisional application No. 62/673,592 filed May 18, 2018. All subject matter set forth in provisional application No. 62/673,592 is hereby incorporated by reference into the present application as if fully set forth herein.

BACKGROUND OF THE INVENTION

Field of the Invention

This invention relates to aerial vehicles and more particularly to an improved unmanned aerial vehicle.

Background of the Invention

Unmanned aerial vehicles (UAV) are types of aircraft that fly with no onboard pilots, crew or passengers. UAVs comprise both autonomous and remotely piloted vehicles. The earliest UAVs were balloons loaded with explosives, which were used by the Austrians in the mid 1800's. Shortly after World War I radio controlled aircraft were developed. Later developments in this technology led to more sophisticated UAV's which included remotely controlled UAVs as well as autonomously guided vehicles.

Drone technology led to the development of more complex systems, with the capability to sustain flight over greater distances and longer flight times. These vehicles proved to be a great asset in military reconnaissance activities. In the 1980's, smaller combat battlefield drones became part of the combat weapon arsenal.

The development of miniature UAVs utilizing both fixed wing and helicopter technologies has substantially advanced the field of UAVs. The development of multi rotor helicopter UAVs simplified the skill required to remotely control these vehicles. These new UAVs have the capability to carry a wide variety of payloads, which include photographic equipment, radiation and chemical detection devices and the like. The availability of micro video devices allows the operator to view the scene of the UAV from a remote location.

In spite of the major advances in UAV technology that have been accomplished, as is well known by those skilled in the art, there remains a need for an easy to transport and rugged.

There have been many in the prior art who have attempted to solve these problems with varying degrees of success. None, however completely satisfies the requirements for a complete solution to the aforestated problem.

Therefore, it is an object of the present invention to provide an improved unmanned aerial vehicle (UAV) that is capable of carrying a variety of payloads.

Another object of this invention is to provide an improved unmanned aerial vehicle (UAV) that is easy to transport.

Another object of this invention is to provide an improved unmanned aerial vehicle (UAV) that is cost effectively produced.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved unmanned aerial vehicle comprising a fuselage defining a front wall, a primary side wall, a secondary side wall and a rear wall. A fuselage chamber is defined within the fuselage. An upper fuselage perimeter edge is defined by the front wall, the primary side wall, the secondary side wall and the rear wall. An upper aperture is defined by the upper perimeter edge. A lower fuselage perimeter edge is defined by the front wall, the primary side wall, the secondary side wall and the rear wall. A lower aperture is defined by the lower perimeter edge. A first boom extends between a proximal end and a distal end. The proximal end of the first boom is coupled to the primary side wall. A first rotor lift assembly is coupled to the distal end of the first boom for providing a first lifting force. A second boom extends between a proximal end and a distal end. The proximal end of the second boom is coupled to the primary side wall. A second rotor lift assembly is coupled to the distal end of the second boom for providing a second lifting force. A third boom extends between a proximal end and a distal end. The proximal end of the third boom is coupled to the secondary side wall. A third rotor lift assembly is coupled to the distal end of the third boom for providing a third lifting force. A fourth boom extends between a proximal end and a distal end. The proximal end of the fourth boom is coupled to the secondary side wall. A fourth rotor lift assembly is coupled to the distal end of the fourth boom for providing a fourth lifting force. An electronic controller system is within the fuselage chamber and operates the first rotor lift assembly, the second rotor lift assembly, the third rotor lift assembly and the fourth rotor lift assembly. An upper cap defines an upper cap perimeter edge. The upper cap perimeter edge abuts the upper fuselage perimeter edge for coupling the upper cap within the fuselage. A lower cap defines a lower cap perimeter edge. The lower cap perimeter edge abuts the lower fuselage perimeter edge for coupling the lower cap within the fuselage.

In another embodiment of the invention, the unmanned aerial vehicle comprises a first boom pivot coupling the first boom with the fuselage. The first boom pivot positions the first boom between an extended position to a folded position. A second boom pivot couples the second boom with the fuselage. The second boom pivot positions the second boom between an extended position to a folded position. A third boom pivot couples the third boom with the fuselage. The third boom pivot positions the third boom between an extended position to a folded position. A fourth boom pivot couples the fourth boom with the fuselage. The fourth boom pivot positions the fourth boom between an extended position to a folded position.

In another embodiment of the invention, the unmanned aerial vehicle has a first boom pivot including a primary extended mating joint and a secondary extended mating joint when the first boom is positioned in the extended position. The primary extended mating joint and the secondary extended mating joint define a first compound extended mounting joint increasing the contact area within the first boom pivot for preventing inadvertent displacement of the first boom pivot when the boom is positioned in the extended position. The first boom pivot includes a primary folded mating joint and a secondary folded mating joint when the first boom is positioned in the folded position. The primary folded mating joint and the secondary folded mating joint define a first compound folded mounting joint increasing the contact area within the first boom pivot and prevents inadvertent displacement of the first boom pivot when the boom is positioned in the folded position.

In another embodiment of the invention, the unmanned aerial vehicle has a first boom pivot including a primary extended channel for permitting the electronic controller system to transverse the first boom pivot when the first boom is positioned in the extended position. The first boom pivot includes a primary folded channel for permitting the electronic controller system to transverse the first boom pivot when the first boom is positioned in the folded position. A coupling channel between from the primary extended channel and the primary folded channel for permitting the electronic controller system to transition between the primary extended channel and the primary folded channel during pivoting of the first boom between the extended position and the folded position.

In another embodiment of the invention, the unmanned aerial vehicle comprises a first leg pivot coupling a first leg with the fuselage. The first leg pivot positions the first leg between an extended position to a folded position. A second leg pivot couples a second leg with the fuselage. The second leg pivot positions the second leg between an extended position to a folded position. A third leg pivot couples a third leg with the fuselage. The third leg pivot positions the third leg between an extended position to a folded position. A fourth leg pivot couples a fourth leg with the fuselage. The fourth leg pivot positions the fourth leg between an extended position to a folded position.

In another embodiment of the invention, the unmanned aerial vehicle has a first leg pivot having a first locking hub coupled to the fuselage. A first pivot pin traverses the first leg and engages the first locking hub. A first leg spring is within the first leg pivot for biasing the first pivot pin into engagement with the first locking hub for terminating pivoting of the first leg relative to the fuselage. A first leg actuator is coupled to the first leg pivot for compressing the first leg spring and distancing the first pivot pin from the first locking hub for permitting pivoting of the first leg relative to the fuselage.

In another embodiment of the invention, the unmanned aerial vehicle has a first leg extending between a proximal end and a distal end. The first leg pivot couples the proximal end of the first leg with the fuselage. A first leg extension is coupled to the distal end of the first leg. The first leg extension and the first leg defining a first obtuse angle there between. The first leg extension is displaced relative to the first leg upon landing of the unmanned aerial vehicle for defining a first shock absorber.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 12 is an isometric view of a leg of FIG. 1;

FIG. 13 is an exploded view of FIG. 12;

FIG. 14 is a front view of FIG. 13;

FIG. 15 is a sectional view along line 15-15 in FIG. 14;

FIG. 16 is a view similar to FIG. 14 illustrating the leg being displaced in a descending direction for allowing the leg to pivot;

FIG. 17 is a sectional view along line 17-17 in FIG. 16;

FIG. 21 is a similar view of FIG. 19 illustrating the boom in a folded position;

FIG. 22 is a sectional view along line 22-22 in FIG. 21;

Similar reference characters refer to similar parts throughout the several FIGS of the drawings.

DETAILED DISCUSSION

Figure 1:
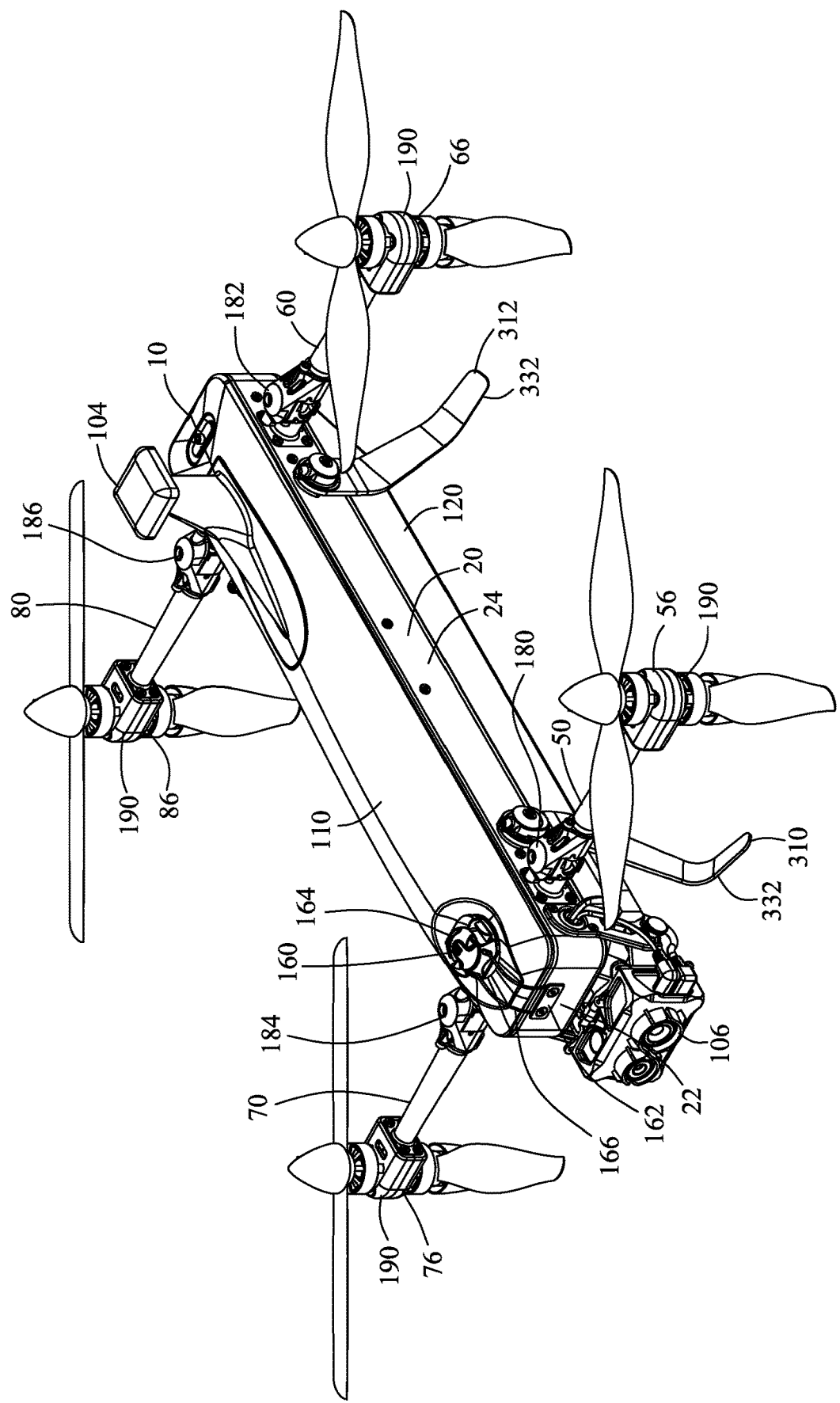
FIG. 1 is a front isometric view of an unmanned aerial vehicle with a plurality of booms in an extended position.
Figure 2:
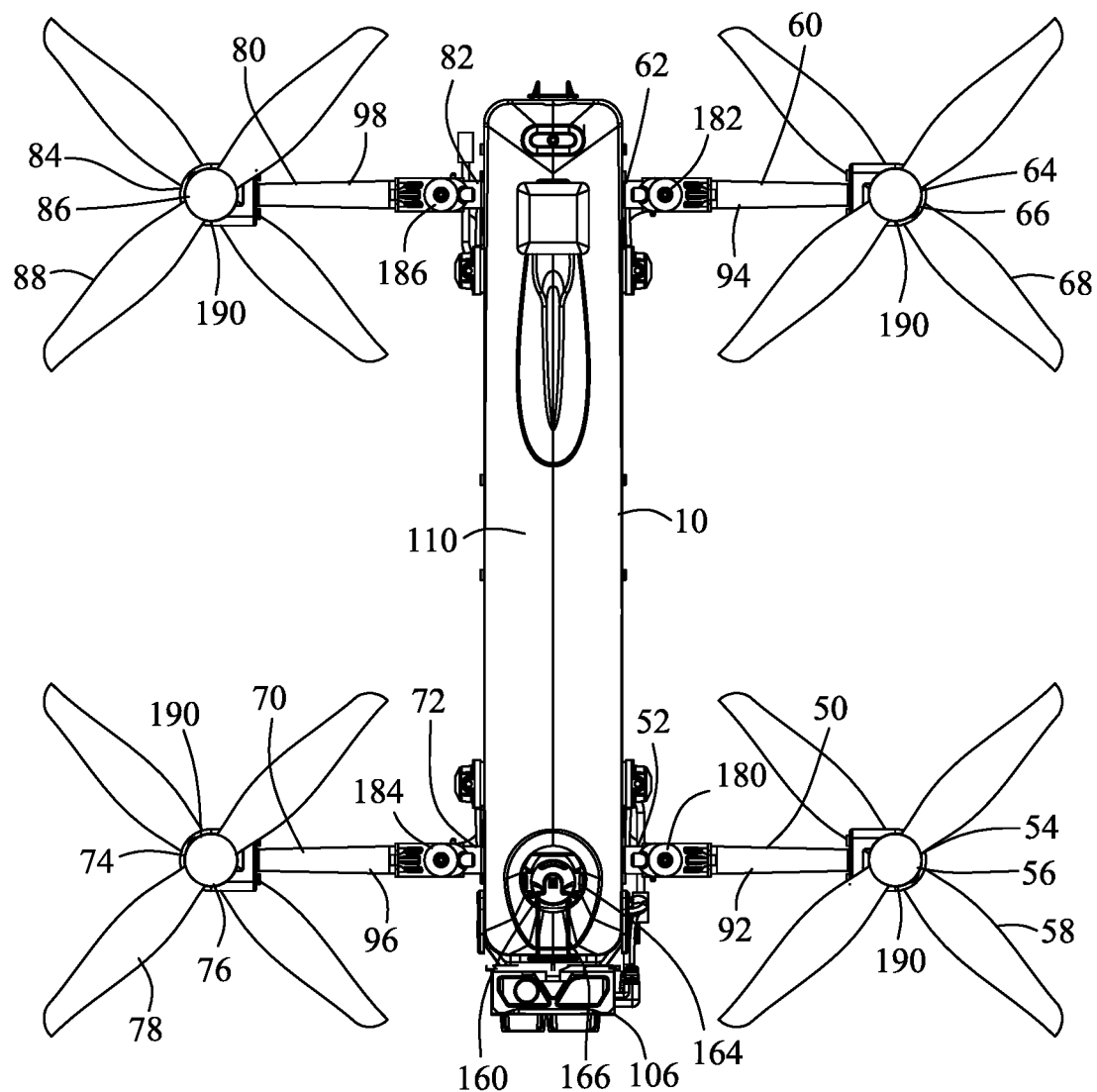
FIG. 2 is a top view of FIG. 1.
Figure 3:
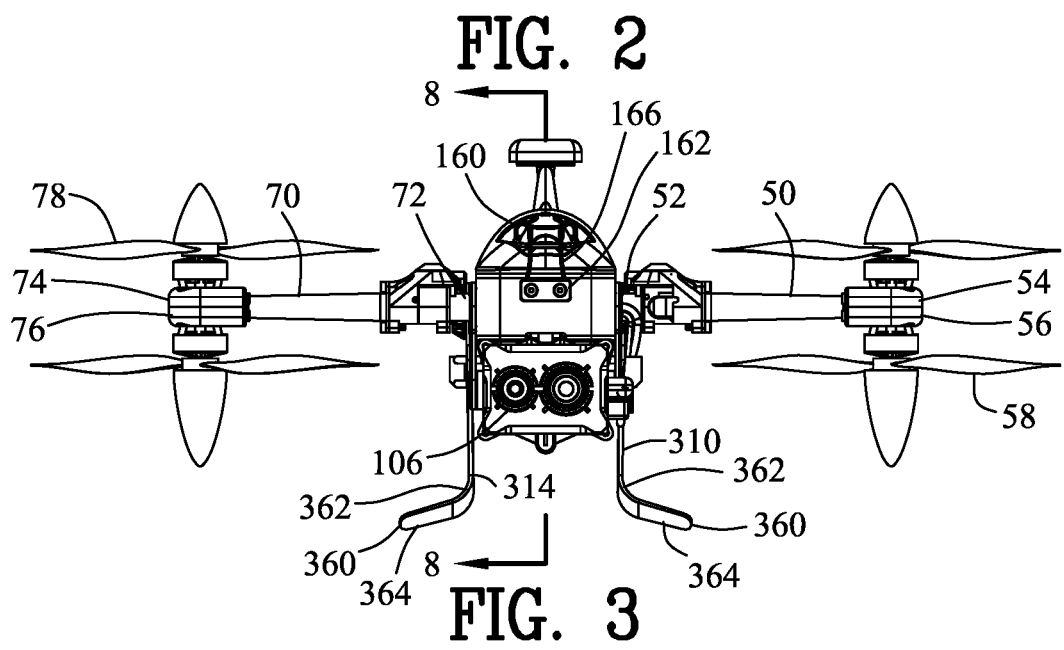
FIG. 3 is a front view of FIG. 1.
Figure 4:
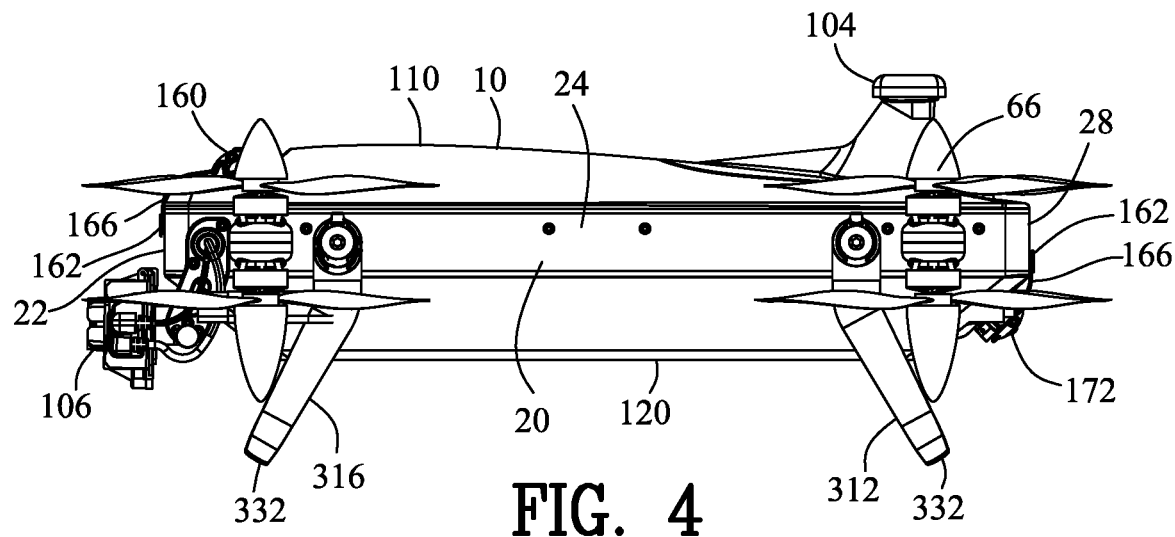
FIG. 4 is a right side view of FIG. 1.
Figure 5:
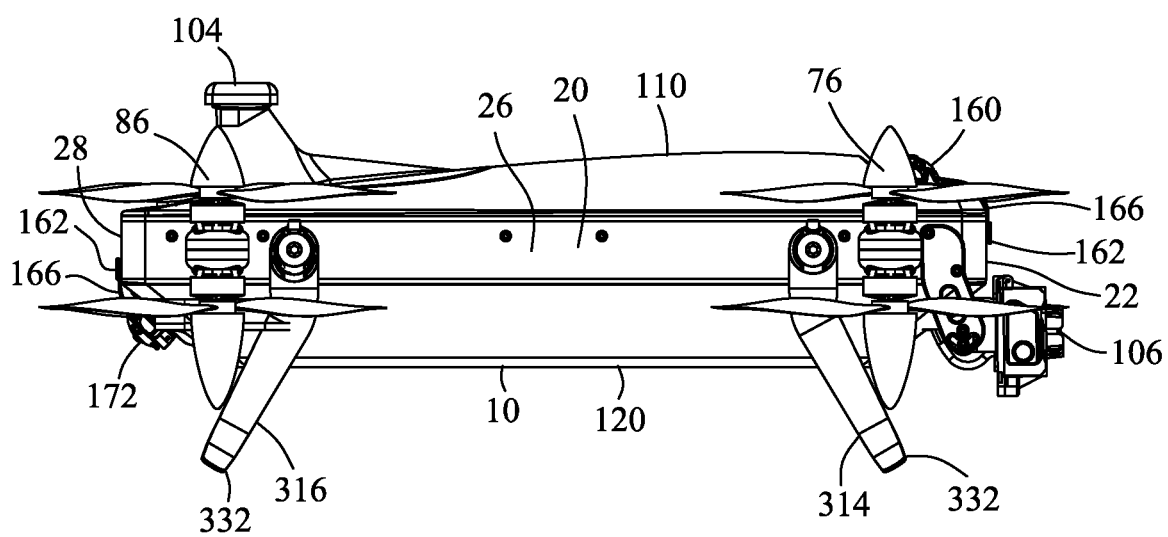
FIG. 5 is a left side view of FIG. 1.
Figure 6:
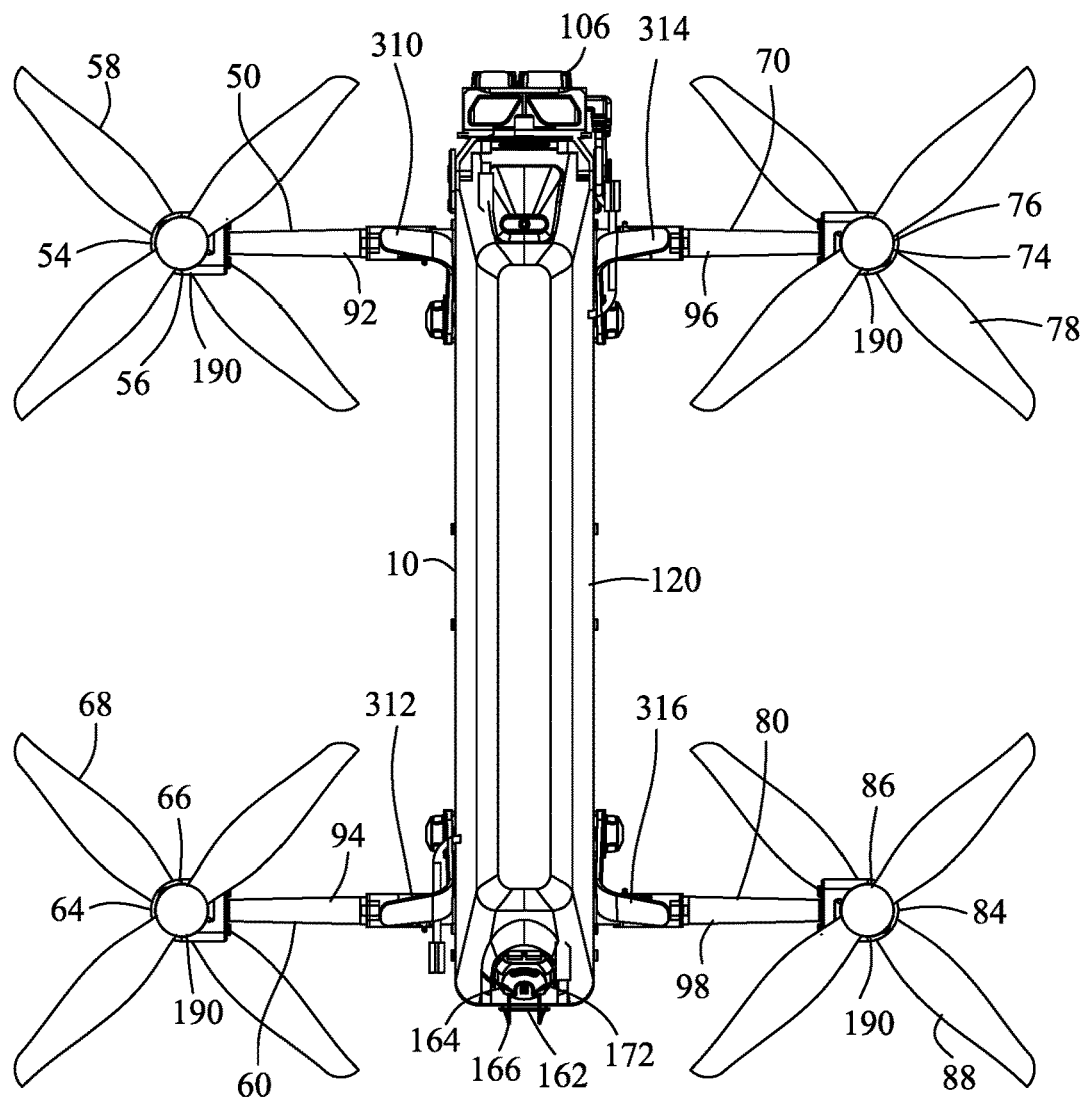
FIG. 6 is a bottom view of FIG. 1.
Figure 7:
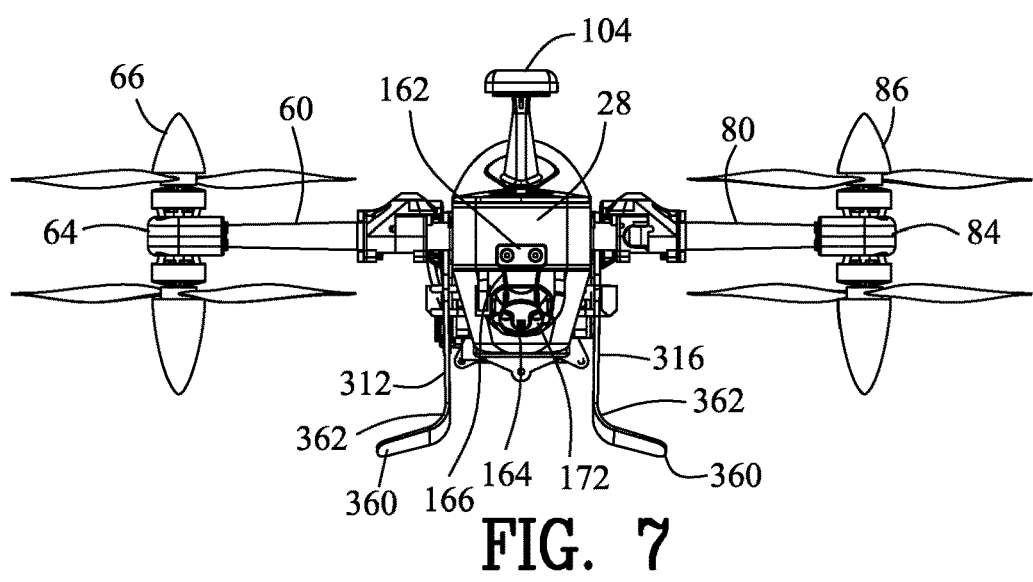
FIG. 7 is a rear view of FIG. 1.
Figure 8:
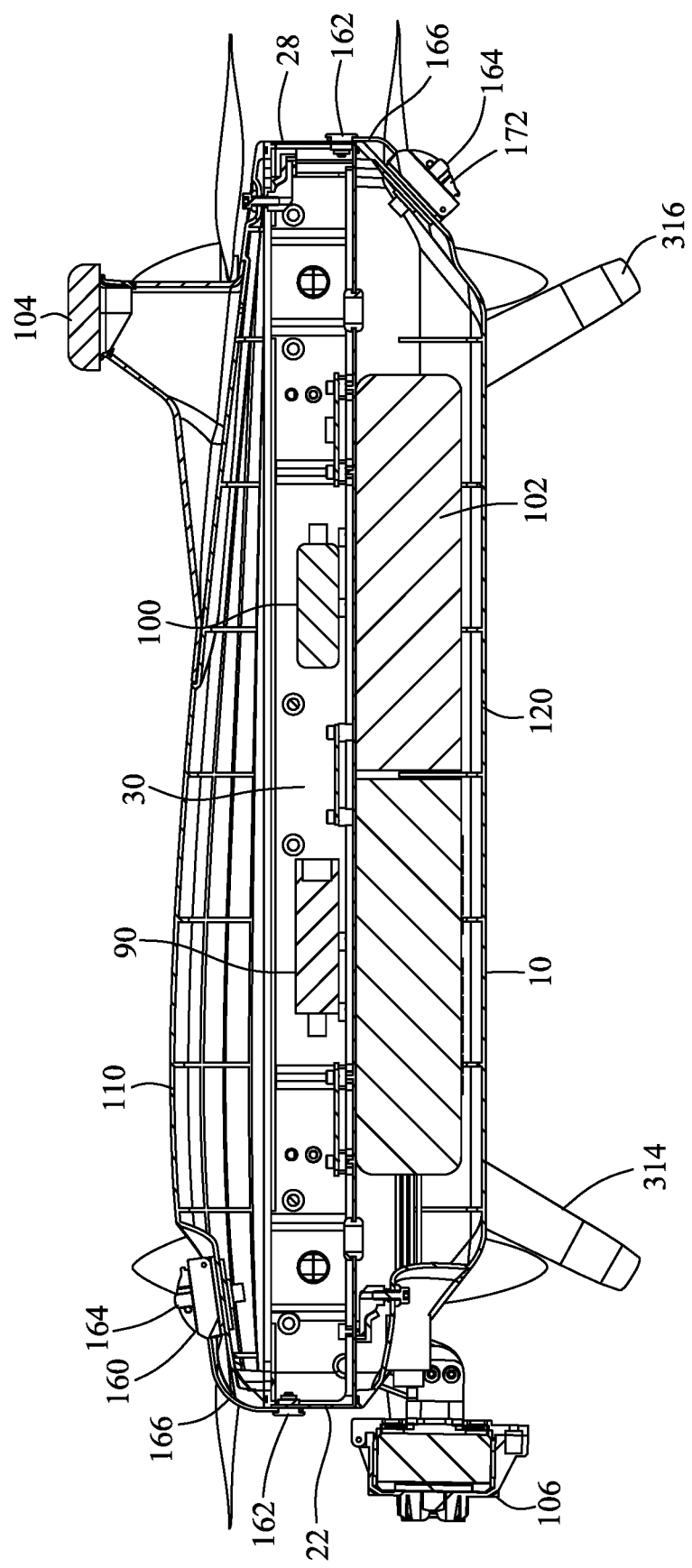
FIG. 8 is a sectional view along line 8-8 in FIG. 3.
Figure 10:
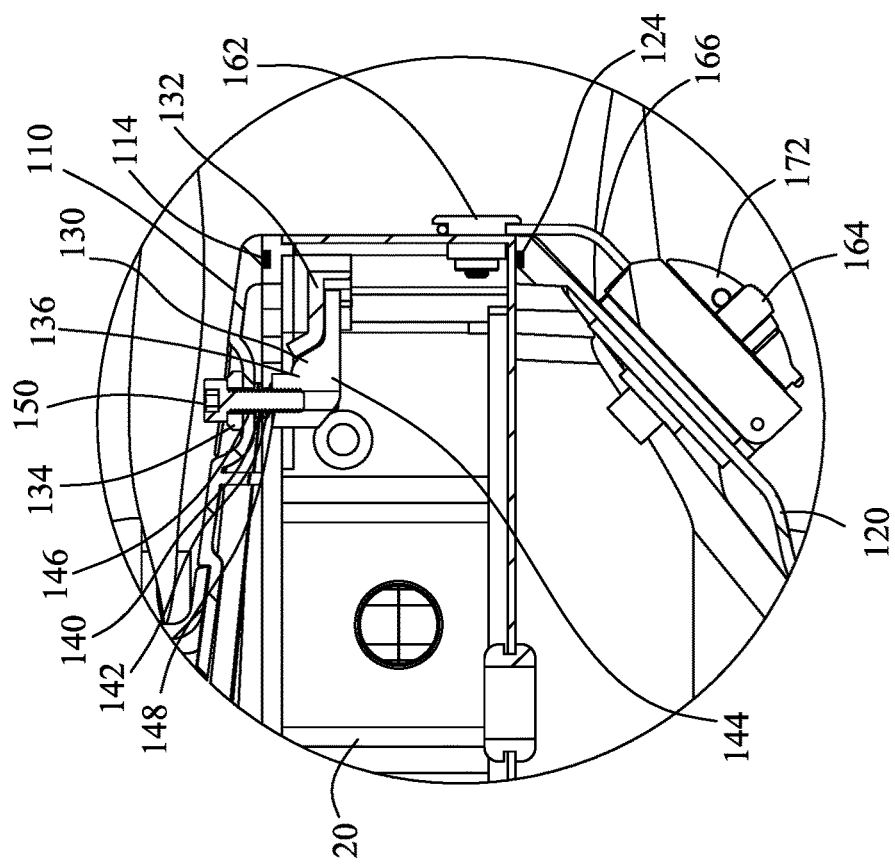
FIG. 10 is an enlarged portion of FIG. 8.
Figure 9:
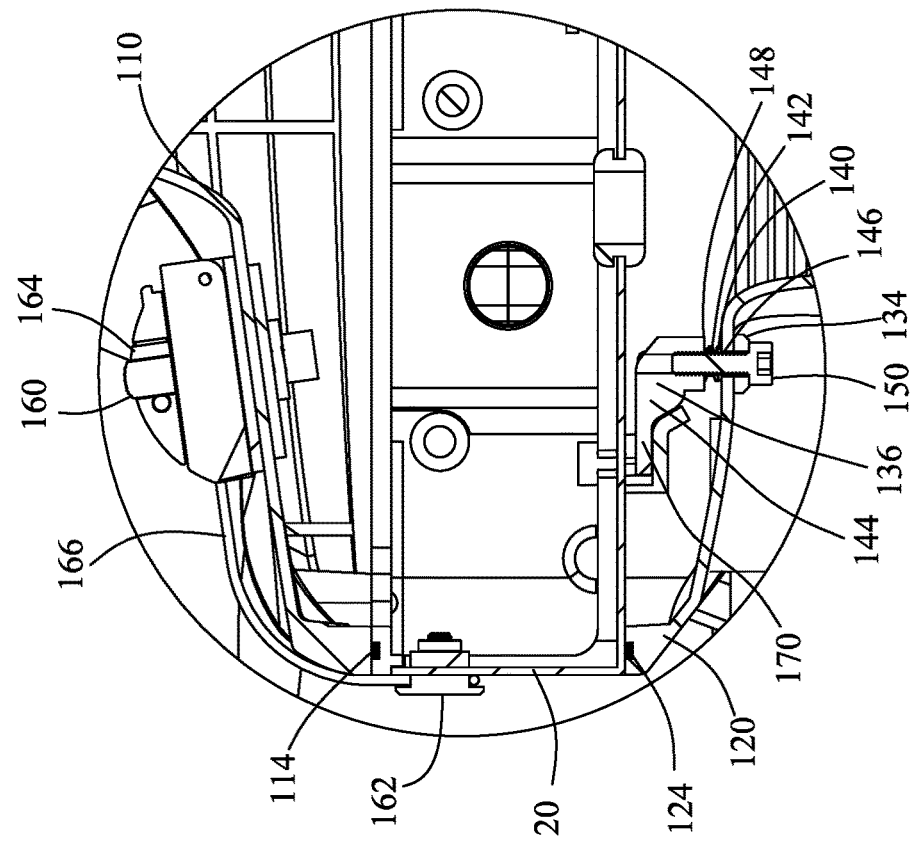
FIG. 9 is an enlarged portion of FIG. 8.
Figure 11:
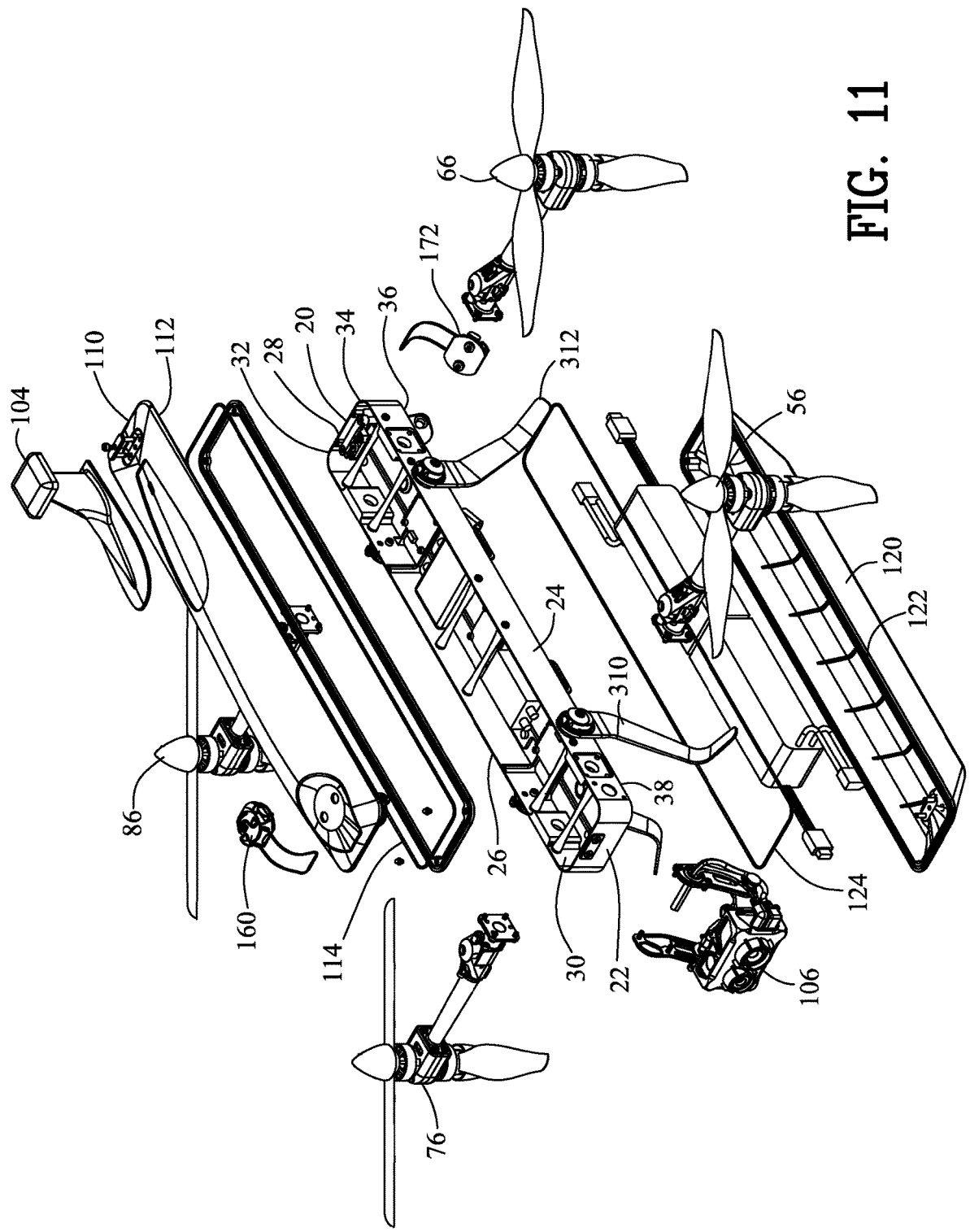
FIG. 11 is an exploded view of FIG. 1.
Figure 18:
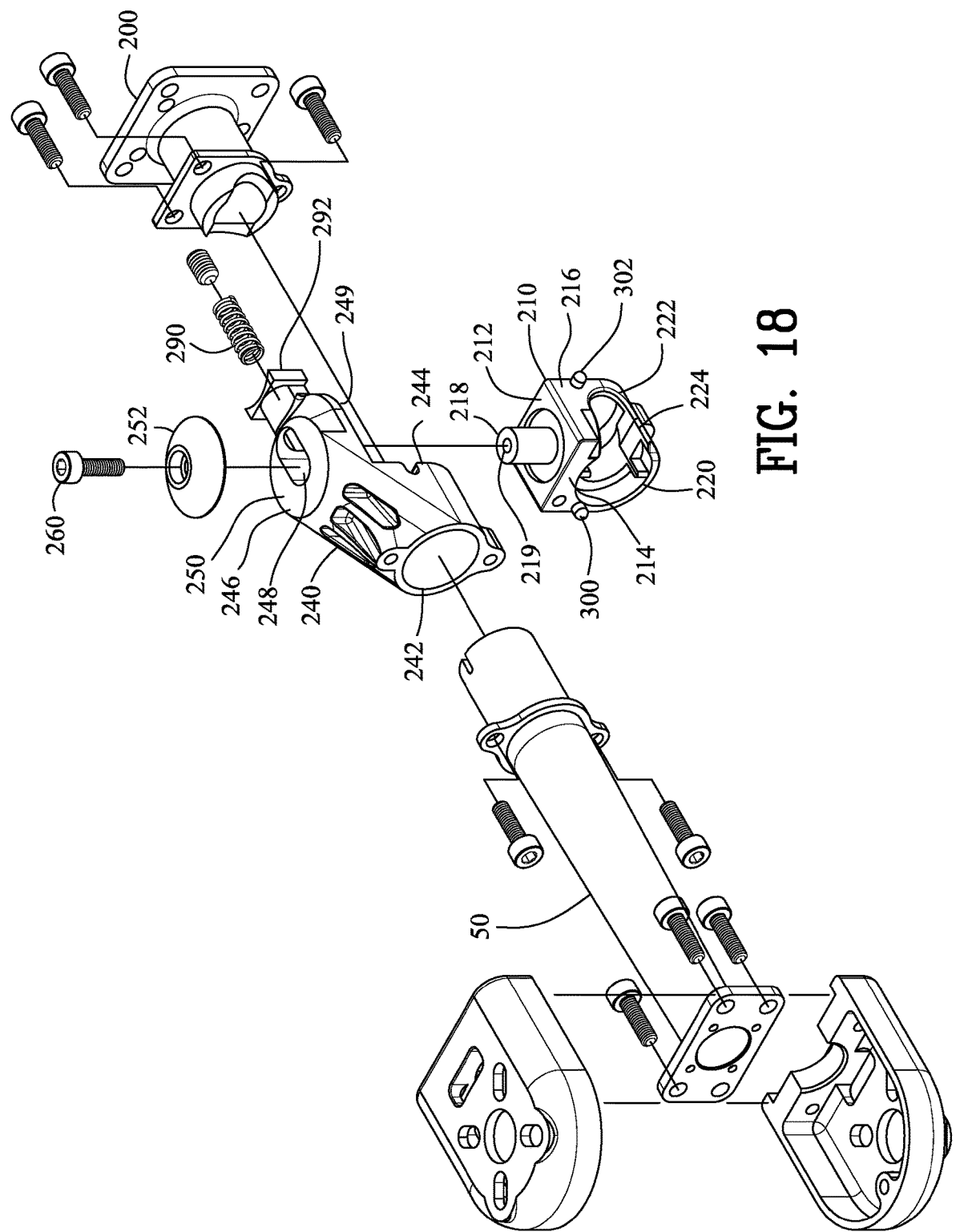
FIG. 18 is an exploded view of a boom of FIG. 1.
Figure 19:
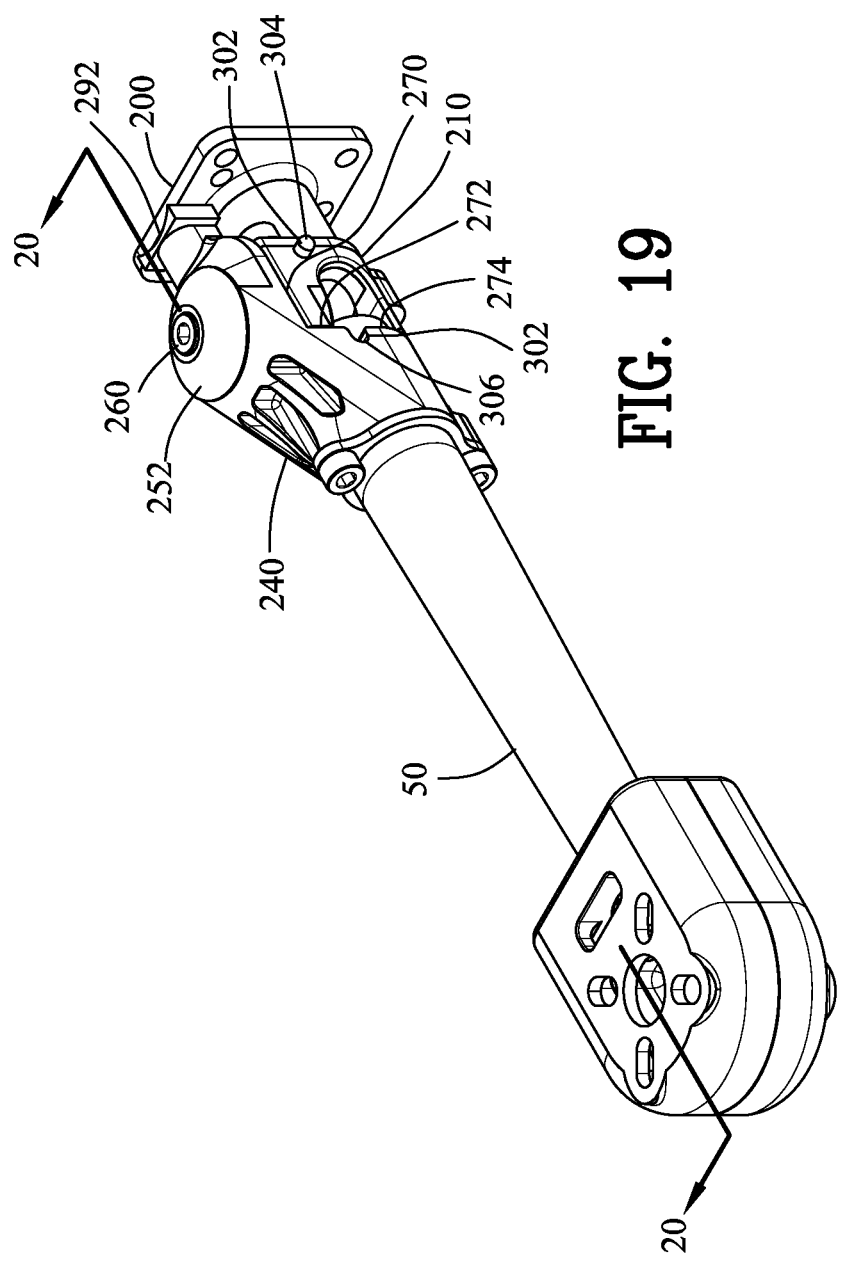
FIG. 19 is an non-exploded view of FIG. 18 illustrating the boom in an extended position.
Figure 20:
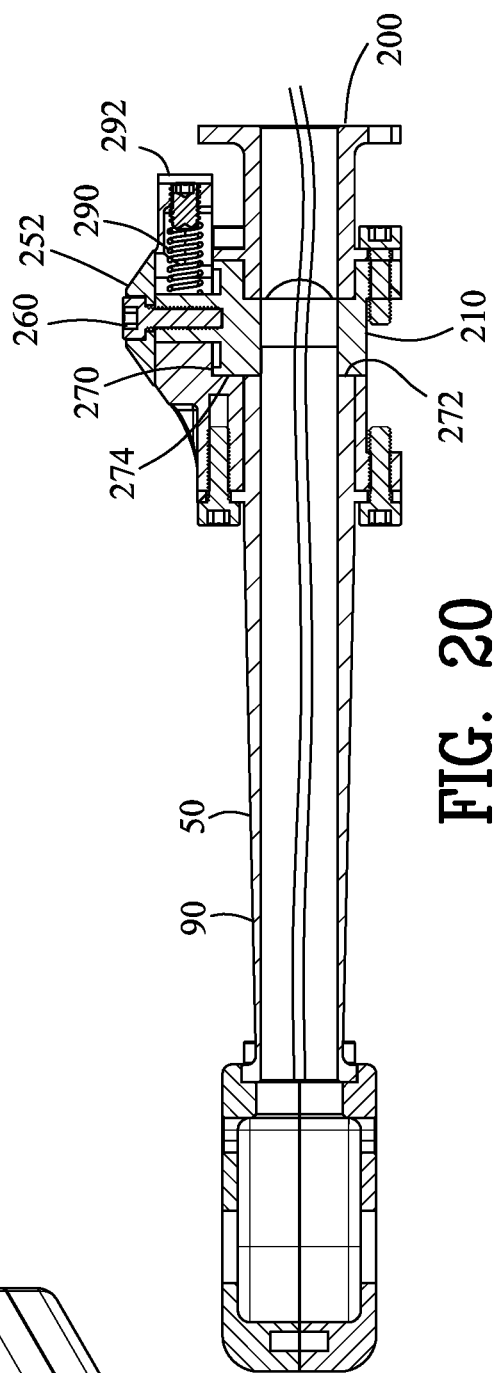
FIG. 20 is a sectional view along line 20-20 in FIG. 19.
Figure 23:
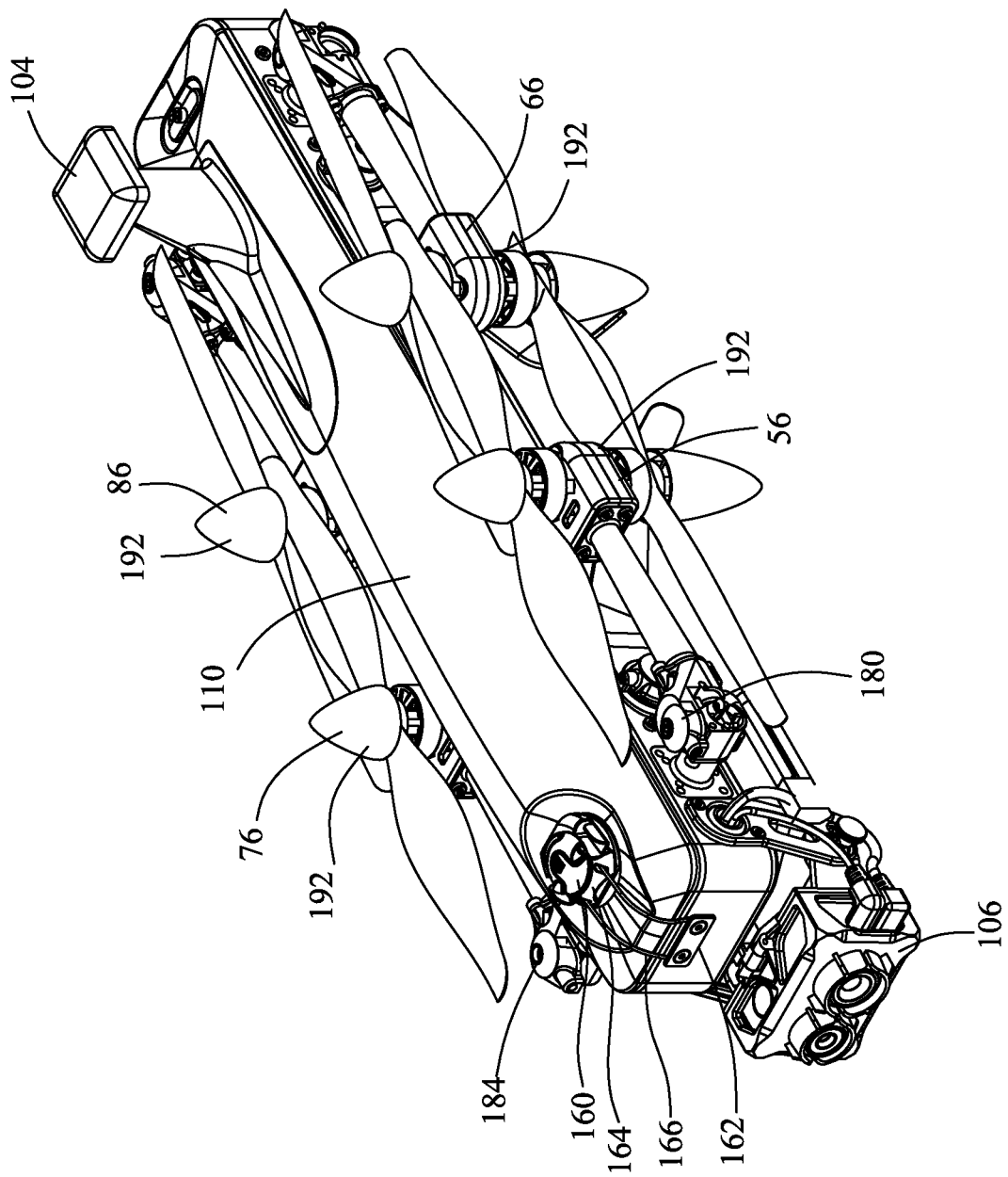
FIG. 23 is a view similar to FIG. 1 illustrating the plurality of booms in a folded position.
Figure 24:
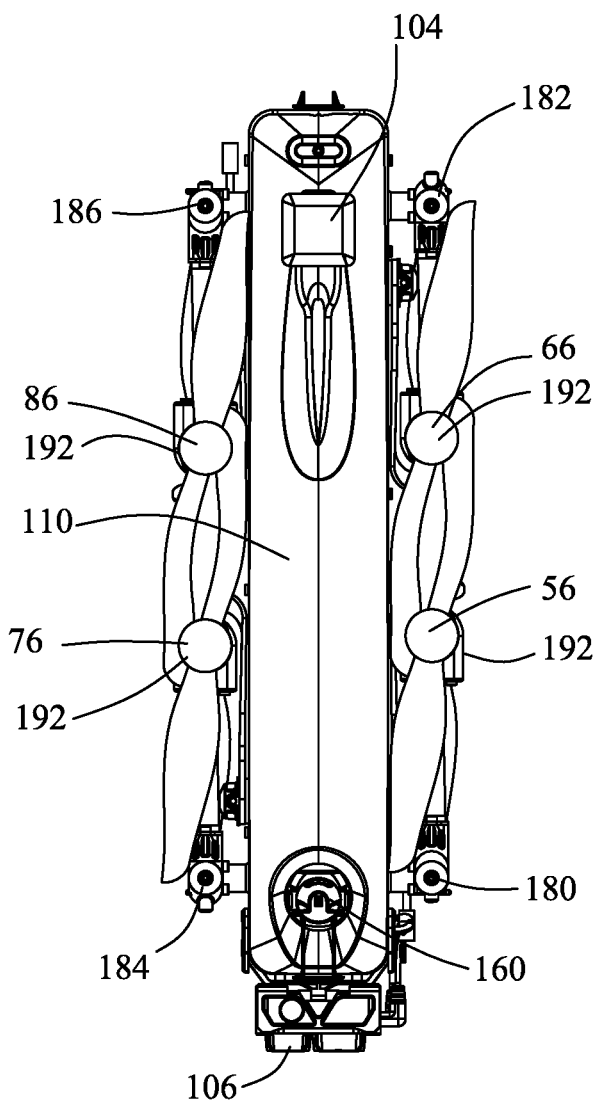
FIG. 24 is a top view of FIG. 23.
Figure 25:
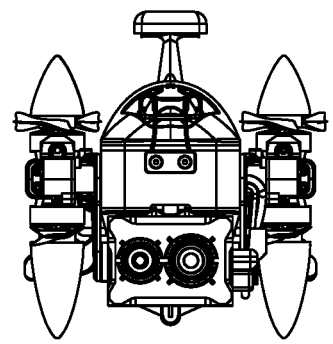
FIG. 25 is a front view of FIG. 23.
Figure 26:
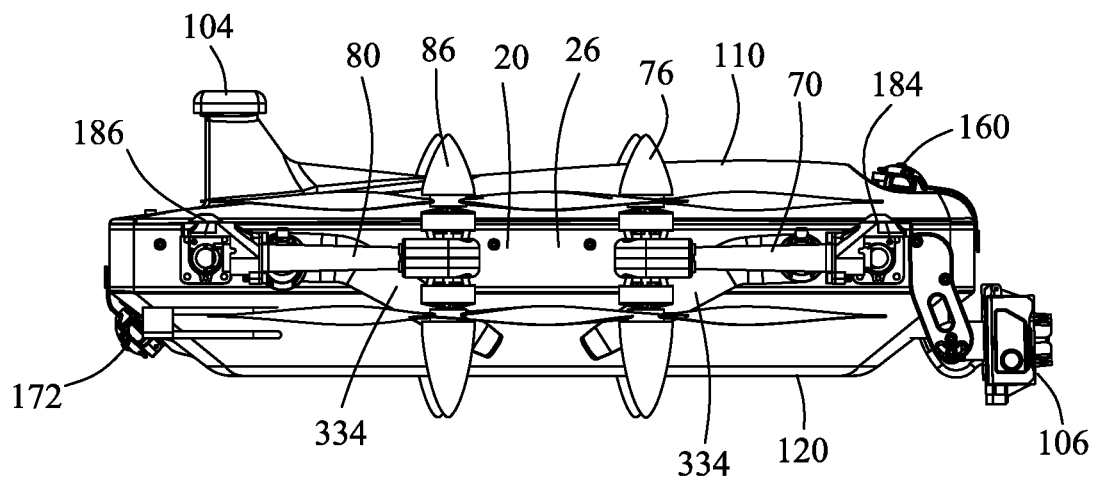
FIG. 26 is a right side view of FIG. 23.
Figure 27:
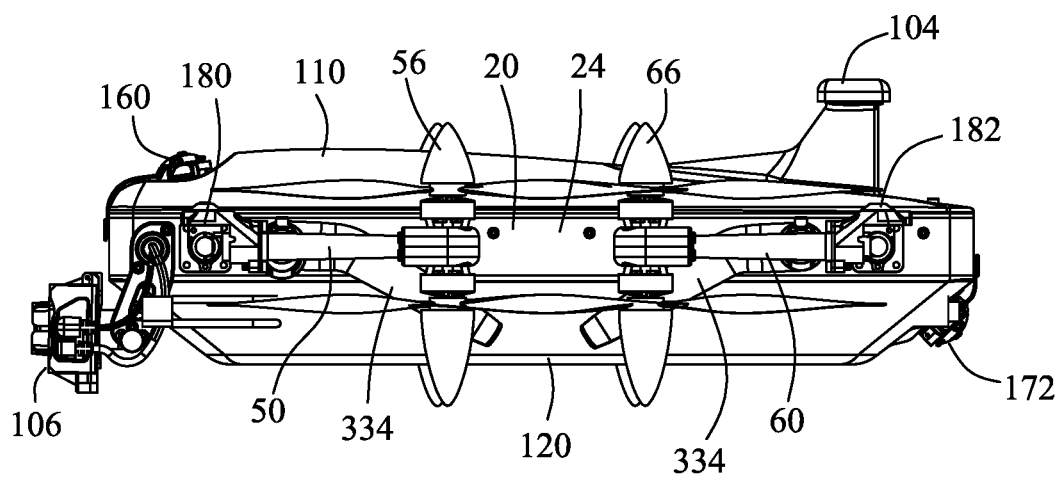
FIG. 27 is a left side view of FIG. 23.
Figure 28:
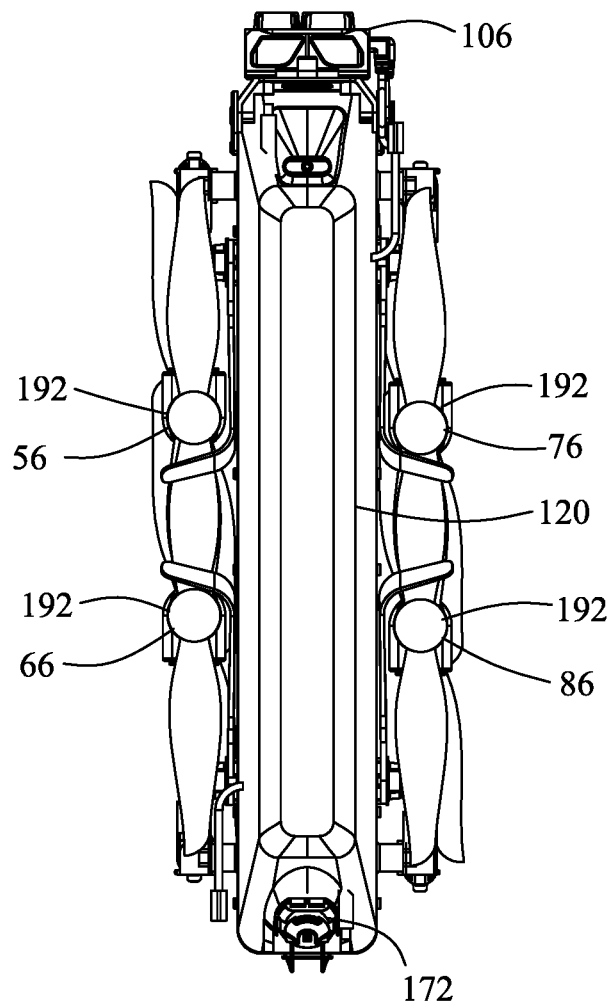
FIG. 28 is a bottom view of FIG. 23.
Figure 29:
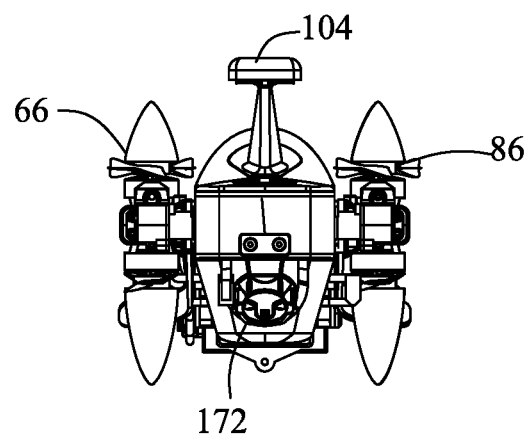
FIG. 29 is a rear view of FIG. 23.

FIGS. 1-29 illustrate an unmanned aerial vehicle 10 comprises a fuselage 20 defining a front wall 22, a primary side wall 24, a secondary side wall 26 and a rear wall 28. A fuselage chamber 30 is defined within the fuselage 20. An upper fuselage perimeter edge 32 is defined by the front wall 22, the primary side wall 24, the secondary side wall 26 and the rear wall 28. An upper aperture 34 is defined by the upper perimeter edge 32. A lower fuselage perimeter edge 36 is defined by the front wall 22, the primary side wall 24, the secondary side wall 26 and the rear wall 28. A lower aperture 38 is defined by the lower perimeter edge 36. Preferably, the fuselage 20 is constructed from an elongated flat plate configuration forming a rectangle body. One or more cross members may extend and be coupled to the interior of the rectangle body. The fuselage 20 may be constructed of a metallic, carbon fiber, polymeric or other materials.

A first boom 50 extends between a proximal end 52 and a distal end 54. The proximal end 52 of the first boom 50 is coupled to the primary side wall 24. A first rotor lift assembly 56 is coupled to the distal end 54 of the first boom 50 for providing a first lifting force 58. A second boom 60 extends between a proximal end 62 and a distal end 64. The proximal end 62 of the second boom 60 is coupled to the primary side wall 24. A second rotor lift assembly 66 is coupled to the distal end 64 of the second boom 60 for providing a second lifting force 68. A third boom 70 extends between a proximal end 72 and a distal end 74. The proximal end 72 of the third boom 70 is coupled to the secondary side wall 26. A third rotor lift assembly 76 is coupled to the distal end 74 of the third boom 70 for providing a third lifting force 78. A fourth boom 80 extends between a proximal end 82 and a distal end 84. The proximal end 82 of the fourth boom 80 is coupled to the secondary side wall 26. A fourth rotor lift assembly 86 is coupled to the distal end 84 of the fourth boom 80 for providing a fourth lifting force 88.

An electronic controller system 90 is within the fuselage chamber 30 and operates the first rotor lift assembly 56, the second rotor lift assembly 66, the third rotor lift assembly 76 and the fourth rotor lift assembly 86. A first electrical conduit 92 transverses within the first boom 50 and electrically couples the electronic controller system 90 to the first rotor lift assembly 56. A second electrical conduit 94 transverses within the second boom 60 and electrically couples the electronic controller system 90 to the second rotor lift assembly 66. A third electrical conduit 96 transverses within the third boom 70 and electrically couples the electronic controller system 90 to the third rotor lift assembly 76. A fourth electrical conduit 98 transverses within the fourth boom 80 and electrically couples the electronic controller system 90 to the fourth rotor lift assembly 86.

An upper cap 110 defines an upper cap perimeter edge 112. The upper cap perimeter edge 112 abuts the upper fuselage perimeter edge 32 for coupling the upper cap 110 within the fuselage 20. The upper cap 110 may be configured for storing the antenna 104. In addition, the upper cap 110 may include an antenna body for housing the antenna 104 within. The upper cap 110 may be constructed of a metallic, carbon fiber, polymeric or other materials. Furthermore, the upper cap 110 may be constructed of a discontinuous carbon fiber, dyneema fiber, innegra fiber, core glass fabric or other composite material.

A lower cap 120 defines a lower cap perimeter edge 122. The lower cap perimeter edge 122 abuts the lower fuselage perimeter edge 36 for coupling the lower cap 120 within the fuselage 20. The lower cap 120 may be configured for storing the battery 102. The lower cap 120 may be constructed of a metallic, carbon fiber, polymeric or other materials. Furthermore, the lower cap 120 may be constructed of a discontinuous carbon fiber, dyneema fiber, innegra fiber, core glass fabric or other composite material.

An upper seal 114 may be positioned between the upper cap perimeter edge 112 and the upper fuselage perimeter edge 32 for sealing the coupling between the upper cap 110 and the fuselage 20. A lower seal 124 may be positioned between the lower cap perimeter edge 122 and the lower fuselage perimeter edge 36 for sealing the coupling between the lower cap 120 and the fuselage 20.

A reinforcing bracket may be coupled to the upper fuselage perimeter edge 32 for increasing the strength of the fuselage and increasing the contact area between the fuselage 20 and the upper cap 110. Similarly, a reinforcing bracket may be coupled to the lower fuselage perimeter edge 36 for increasing the strength of the fuselage and increasing the contact area between the fuselage 20 and the lower cap 120. The reinforcing bracket may include a O-ring groove for receiving the upper seal 114 and the lower seal 124.

The unmanned aerial vehicle 10 may further include an upper pivoting keeper 130 for partially coupling the upper cap 110 and the fuselage 20. More specifically, the upper pivoting keeper 130 may include a primary clip 132 coupled to the interior of the rear wall 28 and a secondary clip 134 coupled to the interior of the upper cap 110.

The secondary clip 134 may include a U-shaped retainer 136 having a first clip spring 140 and a second clip spring 142 engaging the U-shaped retainer 136. A pivot clip bar 144 with a first clip aperture 146 and a second clip aperture 148 slidably engages the U-shaped retainer 136 and compresses the first clip spring 140 and a second clip spring 142 against the U-shaped retainer 136. Fasteners 150 engage the U-shaped retainer 136 for maintaining the pivot clip bar 144 adjacent to the U-shaped retainer 136. The U-shaped retainer 136 is coupled to the interior of the upper cap 110 adjacent to the primary clip 132. The pivot clip bar 144 is able to pivot relative to the U-shaped retainer 136 in order to permit engagement of the primary clip 132 and the secondary clip 134 even when the upper cap 110 is orientated in a non parallel relation to the fuselage 20. Upon engagement between the primary clip 132 and the secondary clip 134 is complete, the upper cap 110 may be pivoted towards the fuselage 20 for converged and abutting the upper cap 110 to the fuselage 20.

The unmanned aerial vehicle 10 may further include an upper tension controlled ratchet closure 160 extending between the upper cap 110 and the fuselage 20 for further coupling and compressing the upper cap 110 with the fuselage 20. More specifically, the upper tension controlled ratchet closure 160 may include a tether clip 162 coupled to the exterior of the front wall 22 and a ratchet 164 coupled to the exterior of the upper cap 110. A tether 166 engages with the tether clip 162 and the ratchet 164. The length of the tether 166 between the tether clip 162 and the ratchet 164 may be altered by rotating the ratchet 164. Upon rotating the ratchet 164, the tether 166 is shortened and the upper cap 110 is compressed with the fuselage 20.

Similarly, a lower pivoting keeper 170 for partially coupling the lower cap 120 and the fuselage 20. More specifically, the lower pivoting keeper 170 may include a primary clip 132 coupled to the interior of the rear wall 28 and a secondary clip 134 coupled to the interior of the lower cap 120.

The secondary clip 134 may include a U-shaped retainer 136 having a first clip spring 140 and a second clip spring 142 engaging the U-shaped retainer 136. A pivot clip bar 144 with a first clip aperture 146 and a second clip aperture 148 slidably engages the U-shaped retainer 136 and compresses the first clip spring 140 and a second clip spring 142 against the U-shaped retainer 136. Fasteners 150 engage the U-shaped retainer 136 for maintaining the pivot clip bar 144 adjacent to the U-shaped retainer 136. The U-shaped retainer 136 is coupled to the interior of the lower cap 120 adjacent to the primary clip 132. The pivot clip bar 144 is able to pivot relative to the U-shaped retainer 136 in order to permit engagement of the primary clip 132 and the secondary clip 134 even when the upper cap 110 is orientated in a non parallel relation to the fuselage 20. Upon engagement between the primary clip 132 and the secondary clip 134 is complete, the lower cap 120 may be pivoted towards the fuselage 20 for converged and abutting the lower cap 120 to the fuselage 20.

The unmanned aerial vehicle 10 may further include a lower tension controlled ratchet closure 172 extending between the lower cap 120 and the fuselage 20 for further coupling and compressing the lower cap 120 with the fuselage 20. More specifically, the lower tension controlled ratchet closure 172 may include a tether clip 162 coupled to the exterior of the rear wall 28 and a ratchet 164 coupled to the exterior of the lower cap 120. A tether 166 engages with the tether clip 162 and the ratchet 164. The length of the tether 166 between the tether clip 162 and the ratchet 164 may be altered by rotating the ratchet 164. Upon rotating the ratchet 164, the tether 166 is shortened and the lower cap 120 is compressed with the fuselage 20.

The unmanned aerial vehicle 10 may further include a first boom pivot 180 coupling the first boom 50 with the fuselage 20. The first boom pivot 180 positions the first boom 50 between an extended position 190 to a folded position 192. A second boom pivot 182 couples the second boom 60 with the fuselage 30. The second boom pivot 182 positions the second boom 60 between an extended position 190 to a folded position 192. A third boom pivot 184 couples the third boom 70 with the fuselage 20. The third boom pivot 184 positions the third boom 70 between an extended position 190 to a folded position 192. A fourth boom pivot 186 couples the fourth boom 80 with the fuselage 20. The fourth boom pivot 186 positions the fourth boom 80 between an extended position 190 to a folded position 192.

The first boom pivot 180, the second boom pivot 182, the third boom pivot 184 and the fourth boom pivot 186 may include a spacer bar 200 coupled between the fuselage 20 and each of the boom pivots 180, 182, 184 and 186. The space bar 200 distances each of the boom pivots 180, 182, 184 and 186 from the fuselage 20. The space bar 200 permits each of the booms 50, 60, 70 and 80 to have a parallel orientation relative to the fuselage 20 in the folded position 192. The spacer bar 200 allowed the unmanned aerial vehicle 10 to be more compactly stored and requiring less volume for storing and transportation.

The boom pivots 180, 182, 184 and 186 may further include a primary pivot member 210 and a secondary pivot member 240. The primary pivot member 210 is coupled to the spacer bar 200 and remains stationary relative to the fuselage 20. The primary pivot member 210 may further include a primary pivot surface 212, a primary extending surface 214 and a primary folded surface 216. A primary pivot arm 218 is coupled to the primary pivot surface 212. The primary pivot member 210 may further include a primary extended channel 220 for permitting the electrical conduit 92, 94, 96 and 98 to transverse the boom pivots 180, 182, 184 and 186 when the boom pivots 180, 182, 184 and 186 are positioned in the extended position 190. The primary pivot member 210 may further include a primary folded channel 222 for permitting the electrical conduit 92, 94, 96 and 98 to transverse the boom pivots 180, 182, 184 and 186 when the boom pivots 180, 182, 184 and 186 are positioned in the folded position 192. A coupling channel is positioned between from the primary extended channel 220 and the primary folded channel 224 for permitting the electrical conduit 92, 94, 96 and 98 to transition between the primary extended channel 220 and the primary folded channel 222 during pivoting of the boom pivots 180, 182, 184 and 186 between the extended position 190 and the folded position 192.

The secondary pivot member 240 may include a collar body 242 defining a secondary surface 244. The secondary pivot member 240 may further include a secondary pivot body 246 having an elongated groove 248. The secondary pivot body 246 defines a secondary pivoting surface 249. The elongated groove 248 receives the primary pivot arm 218 for pivotably engaging the primary pivot member 210 with the secondary pivot member 240. The secondary pivot body 246 may include a secondary pivot brake surface 250. Preferably, the primary pivot arm 218 includes a threaded bore 219. A brake cap 252 abuts the secondary pivot brake surface 250 wherein a threaded fastener 254 threadably engages with the threaded bore 219. The threaded fastener 254 compresses the break cap 252 against the secondary pivot brake surface 250. The threaded fastener 254 further compresses the secondary pivot surface 249 against the primary pivoting surface 214 for locking the primary pivot member 210 relative to the secondary pivot member 240. The locking between the primary pivot member 210 with the secondary pivot member 240 defines a pivot lock 260 for preventing inadvertent displacement of the boom pivots 180, 182, 184 and 186 when the boom pivots 180, 182, 184 and 186 are positioned in the extended position 190 and for preventing inadvertent displacement of the boom pivots 180, 182, 184 and 186 when the boom pivots 180, 182, 184 and 186 are positioned in the folded position 192.

The engagement between the primary pivot surface 212 with the secondary pivot surface 249 defines a primary extended mating joint 270 when the boom pivots 180, 182, 184 and 186 are positioned in the extended position 190. In addition, the engagement between the primary extending surface 214 with the secondary surface 244 defines a secondary extended mating joint 272 when the boom pivots 180, 182, 184 and 186 are positioned in the extended position 190. The primary extended mating joint 270 and the secondary extended mating joint 272 define a first compound extended mounting joint 274 for increasing the contact area within the boom pivots 180, 182, 184 and 186 for preventing inadvertent displacement of the boom pivots 180, 182, 184 and 186 when the boom pivots 180, 182, 184 and 186 are positioned in the extended position 190. The first compound extended mounting joint 274 further prevents angular displacement of the boom pivots 180, 182, 184 and 186 relative to the fuselage 20 when the boom pivots 180, 182, 184 and 186 are positioned in the extended position 190. Furthermore, the first compound extended mounting joint 274 further prevents vibration of the booms 50, 60, 70 and 80 relative to the fuselage 20 when the boom pivots 180, 182, 184 and 186 are positioned in the extended position 190.

The engagement between the primary pivot surface 212 with the secondary pivot surface 249 defines a primary folded mating joint 280 when the boom pivots 180, 182, 184 and 186 are positioned in the folded position 192. In addition, the engagement between the primary folded surface 216 with the secondary surface 244 defines a secondary folded mating joint 282 when the boom pivots 180, 182, 184 and 186 are positioned in the folded position 192. The primary folded mating joint 280 and the secondary folded mating joint 282 define a first compound folded mounting joint 284 for increasing the contact area within the boom pivots 180, 182, 184 and 186 for preventing inadvertent displacement of the boom pivots 180, 182, 184 and 186 when the boom pivots 180, 182, 184 and 186 are positioned in the folded position 192. The first compound folded mounting joint 284 further prevents angular displacement of the boom pivots 180, 182, 184 and 186 relative to the fuselage 20 when the boom pivots 180, 182, 184 and 186 are positioned in the folded position 192. Furthermore, the first compound folded mounting joint 284 further prevents vibration of the booms 50, 60, 70 and 80 relative to the fuselage 20 when the boom pivots 180, 182, 184 and 186 are positioned in the folded position 192.

The boom pivots 180, 182, 184 and 186 may further include a pivot spring 290 located within the elongated groove 248. The pivot spring 290 compresses the first compound extended mounting joint 274 in the extended position 190 and prevents inadvertent displacement of the boom pivots 180, 182, 184 and 186 when the boom pivots 180, 182, 184 and 186 are positioned in the extended position 190. Furthermore, the pivot spring 290 compresses the first compound folded mounting joint 284 in the folded position 190 and prevents inadvertent displacement of the boom pivots 180, 182, 184 when the boom pivots 180, 182, 184 and 186 are positioned in the folded position 192.

The boom pivots 180, 182, 184 and 186 may further include a pivot actuator 292 coupled to the secondary pivot body 246. The pivot actuator 292 may include an engagement platform. The pivot actuator 292 may facilitate receiving a force for compressing the pivot spring 290 within the elongated groove 248. For example, the pivot actuator 292 may receive a thumb of an individual and/or one or more fingers. Upon the compression of the pivot spring 290 the primary extending surface 214 is distanced from the secondary surface 244. Once the primary extending surface 214 is distanced from the secondary surface 244 the boom pivots 180, 182, 184 and 186 are permitted to pivot.

The boom pivots 180, 182, 184 and 186 may further include a primary extended keyed couple 300 when the boom pivots 180, 182, 184 and 186 are positioned in the extended position 190 for preventing inadvertent displacement of the boom pivots 180, 182, 184 and 186 when the boom pivots 180, 182, 184 and 186 are positioned in the extended position 190. The boom pivots 180, 182, 184 and 186 also include a primary folded keyed couple 302 when the boom pivots 180, 182, 184 and 186 are positioned in the folded position 192 for preventing inadvertent displacement of the boom pivots 180, 182, 184 and 186 when the boom pivots 180, 182, 184 and 186 are positioned in the folded position 192. Both of the primary extended keyed couple 300 and the primary folded keyed couple 302 may include a male keyed member 304 and a female keyed member 306. The primary extended keyed couple 300 and the primary folded keyed couple 302 further prevent angular displacement of the boom pivots 180, 182, 184 and 186 relative to the fuselage 20 when the boom pivots 180, 182, 184 and 186 are positioned in the extended position 190 and the folded position 192. Furthermore, the primary extended keyed couple 300 and the primary folded keyed couple 302 further prevent vibration of the booms 50, 60, 70 and 80 relative to the fuselage 20 when the boom pivots 180, 182, 184 and 186 are positioned in the extended position 190 and the folded position 192.

Preferably, the unmanned aerial vehicle 10 may further include a first leg 310, a second leg 312, a third leg 314 and a fourth leg 316. Each of the legs 310, 312, 314 and 316 extend between a proximal end 320 and a distal end 322. The unmanned aerial vehicle 10 may further include a leg pivot 330 for pivotably coupling each of the legs 310, 312, 314 and 316 with the fuselage 20. The leg pivot 330 pivotably couples each of the legs 310, 312, 314 and 316 between an extended position 332 and a folded position 334.

The leg pivot 330 may include a locking hub 340 coupled to the fuselage 20. The locking hub 340 includes one or more locking hub grooves 341. A leg pivot body 342 is positioned adjacent to the exterior of each of the legs 310, 312, 314 and 316. A pivot lock pin 344 is coupled to the leg pivot body 342 and extends through each of the legs 310, 312, 314 and 316 for engaging with the locking hub grooves 341. The leg pivot body 342 further includes an elongated groove 346. A pivot pin 348 traverses the elongated groove 346 and is coupled to the locking hub 340. A leg spring 350 is positioned within the leg pivot 330 for biasing the pivot lock pin 344 into the locking hub 340. The leg pivot body 342 may further include a leg actuator 352. The leg actuator 352 may include an engagement platform. The leg actuator 352 may facilitate receiving a force for compressing the leg spring 350 within the leg pivot body 342. For example, the leg actuator 352 may receive a thumb of an individual and/or one or more fingers. Upon the compression of the leg spring 350 the pivot lock pin 344 is removed from one of the locking of grooves 341 and distanced from the locking hub 340. Once the pivot lock pin 344 is distanced from the locking hub 340 the legs 310, 312, 314 and 316 are permitted to pivot. Preferably the locking hub grooves 341 are positioned such that the legs 310, 312, 314 and 316 are locked into the extended position 332 or the folded position 334.

The leg pivot 330 may further include a locking leg cap 354. The locking leg cap 354 may be integral with the pivot pin 348. The locking leg cap 354 abuts the leg pivot body 342 wherein a threaded fastener threadably engages with the locking hub 340. The threaded fastener compresses the legs 310, 312, 314 and 316 between the locking hub 340 and the leg pivot body 342 for locking the legs 310, 312, 314 and 316 relative to the fuselage 20. The locking between the legs 310, 312, 314 and 316 with the fuselage 20 defines a leg lock 256 for preventing inadvertent displacement of the legs 310, 312, 314 and 316 relative to the fuselage 20 when the legs 310, 312, 314 and 316 are positioned in the extended position 332 and for preventing inadvertent displacement of the legs 310, 312, 314 and 316 when the legs 310, 312, 314 and 316 are positioned in the folded position 334.

The legs 310, 312, 314 and 316 may further include a leg extension 360 coupled to the distal end 322 of the legs 310, 312, 314 and 316. The leg extension 360 and the legs 310, 312, 314 and 316 define an obtuse angle 362 there between. The leg extension 360 is displaced relative to the legs 310, 312, 314 and 316 upon landing of the unmanned aerial vehicle 10 for defining a shock absorber 364. More specifically, the leg extensions 360 changes its angular position relative to the legs 310, 312, 314 and 316 upon a force exerted on the legs 310, 312, 314 and 316 for absorbing the force within the legs 310, 312, 314 and 316 and preventing the transfer of the forced into the fuselage 20.

The below paragraphs discuss the unique features of the unmanned aerial vehicle 10.

The unmanned aerial vehicle 10 can be used for intelligence, surveillance and reconnaissance (ISR), Search & Rescue, Less-Than-Lethal and is munitions capable.

The unmanned aerial vehicle 10 can be used in a wide array of applications to include; inside a GPS denied space, search and rescue, security, oil and gas, CQB, 2-7 km ISR, possible light munitions delivery system for items such as grenades and/or other small warheads, less than lethal weapons such as the FN-303 or Pepper Ball, and or other even lethal weapons for use in law enforcement or Military applications.

The unmanned aerial vehicle 10 can be made amphibious with the ability to float and in the future possibly even swim on-top surface.

The unmanned aerial vehicle 10 may include a unique FLIR Duo camera model, sensor bracket that is adjustable but it's not limited in any way to this model or brand of sensors.

The unmanned aerial vehicle 10 is very aerodynamic in comparison to other aerial vehicles.

The unmanned aerial vehicle 10 may include a more aerodynamic three/sub-assemblies that are sealed (gasketed) against one another. This construction method is comprised of an upper composite cover sub-assembly 110, a middle structural aluminum chassis/parting bracket sub-assembly 20 and a composite lower enclosure 120. The unmanned aerial vehicle's 10 upper housing sub-assembly 110 also features a radiolucent airfoil aerial antenna mount for the GPS and houses other antennas such as ones for video.

The unmanned aerial vehicle 10 may include a middle aluminum chassis 20 that features hard mounting points for any/all critical hardware. This extruded and CNC post-processed aluminum chassis 20 provides mounting surfaces for all electronics, booms, cameras and batteries. The chassis 20 may also feature a wiring management area with cutouts for battery straps.

The chassis 20 may be fabricated from the following; CNC machined aluminum. However the chassis 20 may be comprised largely of extruded materials or discontinuous composite materials and is in no way limited to this kind of construction. Other unique material solutions include; both continuous thermoplastic and other flowable snap cure thermoset composite materials and processes, EMI shielding will be Insitu-laminated strategically into its fuselage.

Conversely, the upper fuselage/antenna-aerial cap 110 is molded from radiolucent materials.

The unmanned aerial vehicle 10 is extremely modular due to its simple mostly rectangular shape and features a much sleeker shape but still practical making it easy to add almost any type of payload including; lidar, FLR, gimbals, weapons and much more.

The rotors 56, 66. 76 and 86 can be shrouded with an airfoil design or three asymmetrical airfoils generating lift in forward attitude mode/flight. The sides can be up of symmetrical airfoils providing fin style guidance in forward fight. This unique airfoil shroud would be manufactured from composite materials or thermoplastics whereby reducing the risk of someone being injured by a collision and generating lift improving overall energy consumption. Alternatively, a simple rotor shroud to prevent bump injuries or damage to or from hitting objects may be added in some embodiments.

The unmanned aerial vehicle 10 may also include an airfoil/rotor guard and wing structure which utilizes lift surfaces to optimize flight time and flight control is a possible configuration that may be added. Some configurations may be more VTOL oriented, not requiring an airfoil whereby a simple rotor guard may be employed.

The unmanned aerial vehicle 10 is assembled using nothing but easy to operate cinch ratchet strap and cams, other cam-latches or over the center latches.

The unmanned aerial vehicle 10 may include a FLIR Duo camera model, sensor bracket that is adjustable.

The motors may feature easy, CNC/Lathe cut booms and extruded/CNC cut motor mounts. The unmanned aerial vehicle 10 provides an easy to pull-and-articulate version of the booms allowing for easy fold and store ability of the drone.

The booms 50, 60, 70 and 80 may feature a breakaway groove, whereby, allowing them to fail during crashes or extremely rough landings to absorb impacts. This feature will minimize the energy transferred into more expensive or harder to replace components.

The booms 50, 60, 70 and 80 may be tapered to minimize surface area.

Additionally, the booms 50, 60, 70 and 80 can be optionally folded when using two blade rotors with a corresponding hinged clevis or alike component.

The unmanned aerial vehicle 10 is completely scalable either up or down in its size The unmanned aerial vehicle 10 may include integrated side or bottom mount (as shown) battery strap interfaces.

The fuselage 20 may be constructed of a rigid aluminum or composite tub with two sealed (gasketed) composite covers.

A machined parting area flange provides and easy sealing surface by creating an undercut surface above the tub.

All electrical components sit in-line (longitudinally) to include; speed controls, autopilot, batteries and more, making this design intuitive to service and integrate with almost any electronic payload.

The booms 50, 60, 70 and 80 can provide motor support for X4-quad motor/rotor configurations or even as shown, X8 counter rotating high thrust versions.

This configuration is in a H-pattern due largely to the CNC/lathe machined booms and its practicality.

The unmanned aerial vehicle 10 may be constructed from any of the below composite construction design methodology:

Engineered Molding Compound (EMC). This is a Snap-Cure (fast cure, usually less than 7 minutes), discontinuous quasi-isotropic 3-D oriented fiber. This designation tends to be for more high-end, lightweight materials such as T-700 PAN Carbon Fiber.

Sheet Molding Compound (SMC). This is usually a Snap-Cure, discontinuous quasi-isotropic 3-D oriented fiber.

Thick Molding Compound (TMC). This is a Snap-Cure material that maybe used to create thicker than normal cross-sections like a parting edge. It can be combined with other alike materials such as EMC, SMC and BMC.

Bulk Molding Compound (BMC). This is sometimes discontinuous chopped fiber or fiber tape and can be either a Snap Cure Epoxy, Vinyl-Ester or even a Thermoplastic System.

Thermoplastic continuous fiber solutions. This comes as a dry pre-impregnated, comingled fiber, powder-coated with polymer or pre-consolidated fiber solution.

Thermoplastic discontinuous fiber solutions. This comes as a dry pre-impregnated, comingled fiber, powder-coated with polymer or pre-consolidated fiber solution.

Thermoset continuous fiber solutions. This comes as a dry fiber/add resin or a pre-impregnated fiber solution.

Thermoset discontinuous fiber solutions. This is the fundamental necessity for it to be a semi flow-able solution.

Compression Molding. All of these materials can be molded in closed matched-metal tools in presses this way.

Long Fiber Thermoplastic Solutions (LFT). This can be compression molded, injection molded or even extruded.

Hybrid Injection and Combined Compression Molding. This process allows for thermoplastic continuous fiber materials to be compression molded and then for homogenous thermoplastic to be injected onto one side or another, whereby, creating extremely complex geometry such as ribs or bosses.

These materials coupled with the associated processes are capable of forcing resin and fiber into complex composite parts with tremendous variation in wall thicknesses.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An unmanned aerial vehicle, comprising:
a fuselage defining a front wall, a primary side wall, a secondary side wall and a rear wall;
a fuselage chamber defined within said fuselage;
an upper fuselage perimeter edge defined by said front wall, said primary side wall, said secondary side wall and said rear wall;
an upper aperture defined by said upper perimeter edge;
a lower fuselage perimeter edge defined by said front wall, said primary side wall, said secondary side wall and said rear wall;
a lower aperture defined by said lower perimeter edge;
a first boom extending between a proximal end and a distal end;
said proximal end of said first boom coupled to said primary side wall;
a first rotor lift assembly coupled to said distal end of said first boom for providing a first lifting force;
a second boom extending between a proximal end and a distal end;
said proximal end of said second boom coupled to said primary side wall;
a second rotor lift assembly coupled to said distal end of said second boom for providing a second lifting force;
a third boom extending between a proximal end and a distal end;
said proximal end of said third boom coupled to said secondary side wall;
a third rotor lift assembly coupled to said distal end of said third boom for providing a third lifting force;
a fourth boom extending between a proximal end and a distal end;
said proximal end of said fourth boom coupled to said secondary side wall;
a fourth rotor lift assembly coupled to said distal end of said fourth boom for providing a fourth lifting force;
an electronic controller system within said fuselage chamber and operating said first rotor lift assembly, said second rotor lift assembly, said third rotor lift assembly and said fourth rotor lift assembly;
an upper cap defining an upper cap perimeter edge;
said upper cap perimeter edge abutting said upper fuselage perimeter edge for coupling said upper cap within said fuselage;
a lower cap defining a lower cap perimeter edge;
said lower cap perimeter edge abutting said lower fuselage perimeter edge for coupling said lower cap within said fuselage;
a first boom pivot coupling said first boom with said fuselage;
said first boom pivot positioning said first boom between an extended position to a folded position;
a second boom pivot coupling said second boom with said fuselage;
said second boom pivot positioning said second boom between an extended position to a folded position;
a third boom pivot coupling said third boom with said fuselage;
said third boom pivot positioning said third boom between an extended position to a folded position;
a fourth boom pivot coup-ling said fourth boom with said fuselage;
said fourth boom pivot positioning said fourth boom between an extended position to a folded position;
wherein said first boom pivot, said second boom pivot, said third boom pivot and said fourth boom pivot including a primary extended mating joint and a secondary extended mating joint when said first boom, said second boom, said third boom and said fourth boom are positioned in said extended position for increasing the contact area and preventing inadvertent displacement of said first boom, said second boom, said third boom and said fourth boom in said extended position;
said first boom pivot, said second boom pivot, said third boom pivot and said fourth boom pivot including a primary folded mating joint and a secondary folded mating joint when said first boom, said second boom, said third boom and said fourth boom are positioned in said folded position for increasing the contact area and preventing inadvertent displacement of said first boom, said second boom, said third boom and said fourth boom in said extended position; and
said first boom pivot, said second boom pivot, said third boom pivot and said fourth boom pivot including a pivot lock for preventing inadvertent displacement of said first boom pivot, said second boom pivot, said third boom pivot and said fourth boom pivot when said booms are positioned in said extended position and for preventing inadvertent displacement of said first boom pivot said second boom pivot, said third boom pivot and said fourth boom pivot when said booms are positioned in said folded position.

2. The unmanned aerial vehicle as set forth in claim 1, further including an upper seal positioned between said upper cap perimeter edge and said upper fuselage perimeter edge for sealing the coupling between said upper cap and said fuselage; and
a lower seal positioned between said lower cap perimeter edge and said lower fuselage perimeter edge for sealing the coupling between said lower cap and said fuselage.

3. The unmanned aerial vehicle as set forth in claim 1, further including an upper pivoting keeper coupling said upper cap and said fuselage;
an upper tension controlled ratchet closure extending between said upper cap and said fuselage for coupling and compressing said upper cap with said fuselage;
a lower pivoting keeper coupling said lower cap and said fuselage; and
a lower tension controlled ratchet closure extending between said lower cap and said fuselage for coupling and compressing said lower cap with said fuselage.

4. The unmanned aerial vehicle as set forth in claim 1, further including a first pivot spring within said first pivot for compressing said first compound extended mounting joint in said extended position and preventing inadvertent displacement of said first boom pivot when said boom is positioned in said extended position; and
said first pivot spring compressing said first compound folded mounting joint in said folded position and preventing inadvertent displacement of said first boom pivot when said boom is positioned in said folded position.

5. The unmanned aerial vehicle as set forth in claim 1, wherein said first boom pivot includes a primary extended keyed couple when said first boom is positioned in said extended position for preventing inadvertent displacement of said first boom pivot when said boom is positioned in said extended position; and said first boom pivot including a primary folded keyed couple when said first boom is positioned in said folded position for preventing inadvertent displacement of said first boom pivot when said boom is positioned in said folded position.

6. The unmanned aerial vehicle as set forth in claim 1, wherein said first boom pivot includes a primary extended channel for permitting said electronic controller system to transverse said first boom pivot when said first boom is positioned in said extended position;
said first boom pivot includes a primary folded channel for permitting said electronic controller system to transverse said first boom pivot when said first boom is positioned in said folded position; and
a coupling channel between from said primary extended channel and said primary folded channel for permitting said electronic controller system to transition between said primary extended channel and said primary folded channel during pivoting of said first boom between said extended position and said folded position.

7. The unmanned aerial vehicle as set forth in claim 1, further including a first leg pivot coupling a first leg with said fuselage;
said first leg pivot positioning said first leg between an extended position to a folded position;
a second leg pivot coupling a second leg with said fuselage;
said second leg pivot positioning said second leg between an extended position to a folded position;
a third leg pivot coupling a third leg with said fuselage;
said third leg pivot positioning said third leg between an extended position to a folded position;
a fourth leg pivot coupling a fourth leg with said fuselage; and
said fourth leg pivot positioning said fourth leg between an extended position to a folded position.

8. The unmanned aerial vehicle as set forth in claim 7, wherein said first leg pivot includes a first locking hub coupled to said fuselage;
a first pivot pin traversing said first leg and engaging said first locking hub;
a first leg spring within said first leg pivot for biasing said first pivot pin into engagement with said first locking hub for terminating pivoting of said first leg relative to said fuselage; and
a first leg actuator coupled to said first leg pivot for compressing said first leg spring and disengaging said first pivot pin from said first locking hub for permitting pivoting of said first leg relative to said fuselage.

9. The unmanned aerial vehicle as set forth in claim 7, wherein said first leg extends between a proximal end and a distal end;
said first leg pivot couples said proximal end of said first leg with said fuselage;
a first leg extension coupled to said distal end of said first leg;
a first obtuse angle defined between said first leg extension and said first leg;
said first leg extension is displaced relative to said first leg upon landing of the unmanned aerial vehicle for defining a first shock absorber.

10. An unmanned aerial vehicle, comprising:
a fuselage defining a fuselage chamber;
a first boom extending between a proximal end and a distal end;
said proximal end of said first boom coupled to said fuselage;
a first rotor lift assembly coupled to said distal end of said first boom for providing a first lifting force;
a second boom extending between a proximal end and a distal end;
said proximal end of said second boom coupled to said fuselage;
a second rotor lift assembly coupled to said distal end of said second boom for providing a second lifting force;
a third boom extending between a proximal end and a distal end;
said proximal end of said third boom coupled to said fuselage;
a third rotor lift assembly coupled to said distal end of said third boom for providing a third lifting force;
a fourth boom extending between a proximal end and a distal end;
said proximal end of said fourth boom coupled to said fuselage;
a fourth rotor lift assembly coupled to said distal end of said fourth boom for providing a fourth lifting force;
an electronic controller system within said fuselage chamber and operating said first rotor lift assembly, said second rotor lift assembly, said third rotor lift assembly and said fourth rotor lift assembly;
a first boom pivot coupling said first boom with said fuselage;
said first boom pivot positioning said first boom between an extended position to a folded position;
a second boom pivot coupling said second boom with said fuselage;
said second boom pivot positioning said second boom between an extended position to a folded position;
a third boom pivot coupling said third boom with said fuselage;
said third boom pivot positioning said third boom between an extended position to a folded position;
a fourth boom pivot coupling said fourth boom with said fuselage;
said fourth boom pivot positioning said fourth boom between an extended position to a folded position;
said first boom pivot includes a primary extended mating joint and a secondary extended mating joint when said first boom is positioned in said extended position;
said primary extended mating joint and said secondary extended mating joint defining a first compound extended mounting joint increasing the contact area within said first boom pivot for preventing inadvertent displacement of said first boom pivot when said boom is positioned in said extended position;
said first boom pivot includes a primary folded mating joint and a secondary folded mating joint when said first boom is positioned in said folded position; and
said primary folded mating joint and said secondary folded mating joint defining a first compound folded mounting joint increasing the contact area within said first boom pivot and preventing inadvertent displacement of said first boom pivot when said boom is positioned in said folded position.

11. The unmanned aerial vehicle as set forth in claim 10, further including a first pivot spring within said first pivot for compressing said first compound extended mounting joint in said extended position and preventing inadvertent displacement of said first boom pivot when said boom is positioned in said extended position; and
said first pivot spring for compressing said first compound folded mounting joint in said folded position and preventing inadvertent displacement of said first boom pivot when said boom is positioned in said folded position.

12. The unmanned aerial vehicle as set forth in claim 10, wherein said first boom pivot includes a primary extended keyed couple when said first boom is positioned in said extended position for preventing inadvertent displacement of said first boom pivot when said boom is positioned in said extended position; and said first boom pivot including a primary folded keyed couple when said first boom is positioned in said folded position for preventing inadvertent displacement of said first boom pivot when said boom is positioned in said folded position.

13. The unmanned aerial vehicle as set forth in claim 10, wherein said first boom pivot includes a primary extended channel for permitting said electronic controller system to transverse said first boom pivot when said first boom is positioned in said extended position;

said first boom pivot includes a primary folded channel for permitting said electronic controller system to transverse said first boom pivot when said first boom is positioned in said folded position; and a coupling channel between from said primary extended channel and said primary folded channel for permitting said electronic controller system to transition between said primary extended channel and said primary folded channel during pivoting of said first boom between said extended position and said folded position.

14. The unmanned aerial vehicle as set forth in claim 10, wherein said first boom pivot includes a first pivot lock for preventing inadvertent displacement of said first boom pivot when said boom is positioned in said extended position and for preventing inadvertent displacement of said first boom pivot when said boom is positioned in said folded position.

15. An unmanned aerial vehicle, comprising:
a fuselage defining a fuselage chamber;
a first boom extending between a proximal end and a distal end;
said proximal end of said first boom coupled to said fuselage;
a first rotor lift assembly coupled to said distal end of said first boom for providing a first lifting force;
a second boom extending between a proximal end and a distal end;
said proximal end of said second boom coupled to said fuselage;
a second rotor lift assembly coupled to said distal end of said second boom for providing a second lifting force;
a third boom extending between a proximal end and a distal end;
said proximal end of said third boom coupled to said fuselage;
a third rotor lift assembly coupled to said distal end of said third boom for providing a third lifting force;
a fourth boom extending between a proximal end and a distal end;
said proximal end of said fourth boom coupled to said fuselage;
a fourth rotor lift assembly coupled to said distal end of said fourth boom for providing a fourth lifting force;
an electronic controller system within said fuselage chamber and operating said first rotor lift assembly, said second rotor lift assembly, said third rotor lift assembly and said fourth rotor lift assembly;
a first leg pivot coupling a first leg with said fuselage;
said first leg pivot positioning said first leg between an extended position to a folded position;
a second leg pivot coupling a second leg with said fuselage;
said second leg pivot positioning said second leg between an extended position to a folded position;
a third leg pivot coupling a third leg with said fuselage;
said third leg pivot positioning said third leg between an extended position to a folded position;
a fourth leg pivot coupling a fourth leg with said fuselage;
said fourth leg pivot positioning said fourth leg between an extended position to a folded position;
said first leg extends between a proximal end and a distal end;
said first leg pivot couples said proximal end of said first leg with said fuselage;
a first leg extension coupled to said distal end of said first leg;
a first obtuse angle defined between said first leg extension and said first leg; and
a first shock absorber defined by said first leg remaining in said extended position and an angular deflection at said first obtuse angle and between said first leg and said first leg extension upon landing of the unmanned aerial vehicle.

16. The unmanned aerial vehicle as set forth in claim 15, wherein said first leg pivot includes a first locking hub coupled to said fuselage;
a first pivot pin traversing said first leg and engaging said first locking hub;
a first leg spring within said first leg pivot for biasing said first pivot pin into engagement with said first locking hub for terminating pivoting of said first leg relative to said fuselage; and
a first leg actuator within said first leg pivot for compressing said first leg spring and distancing said first pivot pin from said first locking hub for permitting pivoting of said first leg relative to said fuselage.

17. An unmanned aerial vehicle, comprising:
a fuselage defining a front wall, a primary side wall, a secondary side wall and a rear wall;
a fuselage chamber defined within said fuselage;
an upper fuselage perimeter edge defined by said front wall, said primary side wall, said secondary side wall and said rear wall;
an upper aperture defined by said upper perimeter edge;
a lower fuselage perimeter edge defined by said front wall, said primary side wall, said secondary side wall and said rear wall;
a lower aperture defined by said lower perimeter edge;
a first boom extending between a proximal end and a distal end;
said proximal end of said first boom coupled to said primary side wall;
a first rotor lift assembly coupled to said distal end of said first boom for providing a first lifting force;
a second boom extending between a proximal end and a distal end;
said proximal end of said second boom coupled to said primary side wall;
a second rotor lift assembly coupled to said distal end of said second boom for providing a second lifting force;
a third boom extending between a proximal end and a distal end;
said proximal end of said third boom coupled to said secondary side wall;

a third rotor lift assembly coupled to said distal end of said third boom for providing a third lifting force;

a fourth boom extending between a proximal end and a distal end;

said proximal end of said fourth boom coupled to said secondary side wall;

a fourth rotor lift assembly coupled to said distal end of said fourth boom for providing a fourth lifting force;

an electronic controller system within said fuselage chamber and operating said first rotor lift assembly, said second rotor lift assembly, said third rotor lift assembly and said fourth rotor lift assembly;

an upper cap defining an upper cap perimeter edge;

said upper cap perimeter edge abutting said upper fuselage perimeter edge for coupling said upper cap within said fuselage;

a lower cap defining a lower cap perimeter edge;

said lower cap perimeter edge abutting said lower fuselage perimeter edge for coupling said lower cap within said fuselage;

an upper pivoting keeper coupling said upper cap and said fuselage;

an upper tension controlled ratchet closure including a tether secured to said fuselage and a ratchet secured to said upper cap wherein rotation of said ratchet causes shortening of said tether within said ratchet and causing said upper cap to be compressed with said fuselage;

a lower pivoting keeper coupling said lower cap and said fuselage; and a lower tension controlled ratchet closure including a tether secured to said fuselage and a ratchet secured to said lower cap wherein rotation of said ratchet causes shortening of said tether within said ratchet and causing said lower cap to be compressed with said fuselage.

* * * * *